(12) United States Patent
Shiell et al.

(10) Patent No.: US 8,306,257 B2
(45) Date of Patent: Nov. 6, 2012

(54) HIERARCHICAL TREE AAM

(75) Inventors: Derek Shiell, Los Angeles, CA (US);
Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 13/017,891

(22) Filed: Jan. 31, 2011

(65) Prior Publication Data

US 2012/0195495 A1 Aug. 2, 2012

(51) Int. Cl.
*G06K 9/00* (2006.01)
*H04N 5/225* (2006.01)

(52) U.S. Cl. .................................. 382/100; 348/169

(58) Field of Classification Search .................. 382/103, 382/165, 170, 181, 236; 348/94, 169, 170, 348/171, 172, 208.14, 352; 700/47; 704/231, 704/251, 256.2; 706/20
See application file for complete search history.

(56) References Cited

U.S. PATENT DOCUMENTS 7,680,330 B2 * 3/2010 Leung ........................... 382/181

OTHER PUBLICATIONS

Xu, Z., et al., "A Hierarchical Compositional Model for Face Representation and Sketching", IEEE Transactions on Pattern Analysis and Machine Intelligence, vol. 30, No. 6, Jun. 2008.
Muldner, T., et al., "Explaining Algorithms: A New Perspective", International Journal Distance Education Technologies, vol. 4, issue 3, 2006.
Muldner, T., et al., "Using Structured Hypermedia to Explain Algorithms", Proceedings of the IADIS International Conference e-Society, 2005.

* cited by examiner

*Primary Examiner* — Abolfazl Tabatabai
(74) *Attorney, Agent, or Firm* — Rosalio Haro

(57) ABSTRACT

An active appearance model is built by arranging the training images in its training library into a hierarchical tree with the training images at each parent node being divided into two child nodes according to similarities in characteristic features. The number of node levels is such that the number of training images associated with each leaf node is smaller than a predefined maximum. A separate AAM, one per leaf node, is constructed using each leaf node's corresponding training images. In operation, starting at the root node, a test image is compared with each parent node's two child nodes and follows a node-path of model images that most closely matches the test image. The test image is submitted to an AAM selected for being associated with the leaf node at which the test image rests. The selected AAM's output aligned image may be resubmitted to the hierarchical tree if sufficient alignment is not achieved.

29 Claims, 24 Drawing Sheets

HIERARCHICAL TREE AAM

BACKGROUND

1. Field of Invention

The present invention relates to an active appearance model, AAM, machine and method. More specifically, it relates to an AAM approach whose training phase creates multiple smaller AAMs capable of aligning an input test image more quickly through uses of multiple small AAM as opposed to a single large AAM, and is further able to align a larger range of input test images than typical by providing better support for outlier true examples of a class of object.

2. Description of Related Art

In the field of computer vision, it is generally desirable that an image not only be captured, but that a computer be able to identify and label various features within the captured image. Basically, a goal of computer vision is for the computer to "understand" the content of a captured image.

Various approaches to identifying features within a captured image are known. Early approaches centered on the concept of identifying shapes. For example, if a goal was to identify a specific item, such as wrench or a type of wrench, then a library of the different types of acceptable wrenches (i.e. "true examples" defined as images of "true" wrenches) would be created. The outline shapes of the wrenches within these true examples would be stored, and a search for the acceptable shapes would be conducted on a captured image. This approach of shape searching was successful when one had an exhaustive library of acceptable shapes, the library was not overly large, and the subject of the captured images did not deviate from the predefined true shapes.

For complex searches, however, this approach is not effective. The limitations of this approach become readily apparent when the subject being sought within an image is not static, but is prone to change. For example, a human face has definite characteristics, but does not have an easily definable number of shapes and/or appearances it may adopt. It is to be understood that the term appearance is herein used to refer to color and/or light differences across an object, as well as other surface/texture variances. The difficulties in understanding a human face becomes even more acute when one considers that it is prone to shape distortion and/or change in appearance within the normal course of human life due to changes in emotion, expression, speech, age, etc. It is self-apparent that compiling an exhaustive library of human faces and their many variations is a practical impossibility.

Recent developments in image recognition of objects that change their shape and appearance, such as a human face, are discussed in "Statistical Models of Appearance for Computer Vision", by T. F. Cootes and C. J. Taylor (hereinafter Cootes et al.), Imaging Science and Biomedical Engineering, University of Manchester, Manchester M13 9PT, U.K. email: t.cootes@man.ac.uk, http://www.isbe.man.ac.uk, Mar. 8, 2004, which is hereby incorporated in its entirety by reference.

Cootes et al. explain that in order for a machine to be able to understand what it "sees", it must make use of models that describe and label the expected structure being imaged. In the past, model-based vision has been applied successfully to images of man-made objects, but their use has proven more difficult in interpreting images of natural subjects, which tend to be complex and variable. The main problem is the variability of the subject being examined. To be useful, a model needs to be specific, that is, it should represent only true examples of the modeled subject. To identify a variable object, however, the model needs to be general and represent any plausible true example of the class of object it represents.

Recent developments have shown that this apparent contradiction can be handled by statistical models that can capture specific patterns of variability in shape and appearance. It has further been shown that these statistical models can be used directly in image interpretation.

To facilitate the application of statically models, subjects to be interpreted are typically separated into classes. This permits the statistical analysis to use prior knowledge of the characteristics of a particular class to facilitate its identification and labeling, and even to overcome confusion caused by structural complexity, noise, or missing data.

Additionally, in order to facilitate further processing of identified and labeled subjects within a captured image, it is beneficial for the identified subject to be transformed into (i.e. be fitted onto) a "model" or "canonical" shape of the class of object being sought. Preferably, this model, or canonical, shape would be of predefined shape and size, and have an inventory of labels identifying characteristic features at predefined locations within the predefined shape. For example, although the human face can vary widely, it can be conformed to a standard shape and size. Once conformed to the standard shape and size, the transformed face can then be further processed to determine its expression, its gaze direction, the individual to whom the face belongs, etc.

A method that uses this type of alignment is the active shape model. With reference to FIG. 1, the active shape model uses a predefined model face 1A and a list of predefined deformation parameters, each having corresponding deformation constraints, to permit the model face to be stretched and move to attempt to align it with a subject image 2. Equivalently, the list of predefined deformation parameters may be applied to subject image 2, and have it be moved and deformed to attempt to align it with model face 1A. This alternate approach has the added benefit that as subject image 2 is being aligned with model face 1A, it is simultaneously being fitted to the shape and size of model face 1A. Thus, once alignment is complete, the fitted image is already in a preferred state for further processing.

For illustrative purposes, FIG. 1 shows model face 1A being fitted to subject face 2. The example of FIG. 1 is an exaggerated case for illustration purposes. It is to be understood that a typical model face 1A would have constraints regarding its permissible deformation points relative to other points within itself. For example, if aligning the model face meant moving its left eye up one inch and moving its right eye down one inch, then the resultant aligned image would likely not be a human face, and thus such a deformation would typically not be permissible.

In the example of FIG. 1, model face 1A is first placed roughly within the proximity of predefined points of interest, and typically placed near the center of subject face 2, as is illustrated in image 3. By comparing the amount of misalignment resulting from moving model face 1A in one direction or another, and the results of adjusting a size multiplier in any of several predefined directions, one can determine how to better align model face 1A, as illustrated in image 4. An objective would be to align as closely as possible predefined landmarks, such as the pupils, nostril, mouth corners, etc., as illustrated in image 5. Eventually, after a sufficient number of such landmark points have been aligned, the subject image 2 is warped onto model image 1A resulting in a fitted image 6 of predefined shape and size with identified and labeled points of interest (such as outlines of eye features, nose features, mouth features, cheek structure, etc.) that can be further processed to achieve specific objectives.

This approach, however, does not take into account changes in appearance; such as for example, changes in shadow, color, or texture. A more holistic, or global, approach that jointly considers the object's shape and appearance is the Active Appearance Model (AAM). Although Cootes et al. appear to focus primarily on the gray-level (or shade) feature of appearance, they do describe a basic principle that AAM searches for the best alignment of a model face (including both model shape parameters and model appearance parameters) onto a subject face while simultaneously minimizing misalignments in shape and appearance. In other words, AAM applies knowledge of the expected shapes of structures, their spatial relationships, and their gray-level appearance (or more generally color value appearance, such as RGB values) to restrict an automated system to plausible interpretations. Ideally, AAM is able to generate realistic images of sought objects. An example would be a model face capable of generating convincing images of any individual, such as by changing the individual's expression. AAM achieves this by formulating interpretation as a matching problem: given an image to interpret, structures are located and labeled by adjusting the model's parameters in such a way that it generates an "imagined image" that is as similar as possible to a plausible variation.

Although AAM is a useful approach, implementation of AAM still poses several challenges. For instance, as long as the AAM machine manages to find a "fit" within its defined parameters, it will assume that the fitted image is a match, (i.e. a true example of a plausible variation). However, there is no guarantee that the fitted image is in fact a true example.

In other words, even if an AAM machine appears to have aligned a subject input image with a model image, the resulting aligned image may not be a true representation of the class of object being sought. For example, if the initial position of the model image is too far misaligned from the subject input image, the model image may be aligned incorrectly on the subject input image. This would result in a distorted, untrue, representation of the warped output image.

Other limitations of an AAM machine relate to the computing complexity required to apply statistical analysis to a training library of true samples, in order to define distinguishing parameters and define the parameter's permissible distortions. By the nature of the applied statistical analysis, the results will permit alignment only with a fraction of the images within the training library. If the class of object being sought is prone to wide variation, it may not be possible to properly align a shape model image or an appearance model image to an input subject image that has characteristics beyond a norm defined by the statistical analysis. This is true of even images within the training library from which the shape model image and appearance model image are constructed. Typically, the constructed model image will be capable of being aligned to only 90% to 95% of the sample images within a training library.

SUMMARY OF INVENTION

It is an object of the present invention to provide an AAM with faster alignment process, particularly when training using an extended, large library of true sample images.

It is another object of the present invention to provide an AAM better able to align a larger number of true samples of a specific class of object, including true outlier samples.

These objects are achieved in an object recognition device for recognizing a class of object in an input test image, the device comprising: an input for receiving the input test image; a plurality of active appearance model processing blocks (AAMs), each of the plurality of AAMs having been trained with a distinct group of independent, digital training images, each training image in all groups of training images having a true example of the class of object with a common, predefined set of characteristic features of the class of object identified and labeled, each group of training images being made distinct by sharing specific traits in select characteristic features distinct from the specific traits in other groups of training images, each of the plurality of AAMs having a corresponding model image and a corresponding statistical model fitting function reflecting the specific traits of the group of training images from which it is trained; a data processing module for implementing the following data processing steps: (a) defining the input test image as a current_image; (b) applying the current_image to a selected AAM selected from among the plurality of AAMs, the selected AAM having a corresponding model image that most closely matches the current_image as compared to the model images corresponding to the not-selected AAMs, the selected AAM processing the current_image to produce an intermediate aligned image; (c) IF a misalignment measure of the intermediate aligned image and a predefined model image is greater than a predefined maximum measure, THEN defining the intermediate aligned image as the current_image and returning to step (b), ELSE outputting the intermediate aligned image as a successful recognition of the class of object.

In this device, in step (c), within the IF statement, the predefined model image is the selected AAM's corresponding model image. Alternatively wherein in step (c), within the IF statement, the predefined model image is a model image created from a combination of all the groups of training images used to train all of the plurality of AAMs. Further alternatively within in step (c), the IF statement further includes: AND IF step (b) has been executed less than a fixed, maximum cycle count.

Additionally in step (c), the IF statement further includes: AND IF the misalignment measure is smaller than the misalignment measure obtained in an immediately previous application of step (b).

Also in step (b), the selected AAM has a statistical model fitting function whose reflected specific traits most closely match the same traits on the current_image. Preferably, in step (b), a misalignment measure of the current_image and the model image corresponding to the selected AAM is smaller than a misalignment measure of the current_image and the model images corresponding to all other of the plurality of AAMs.

The above-described recognition device, wherein: (A) the plurality of AAMs are accessible through a hierarchical tree path with a separate one of the plurality of AAMs being associated with a corresponding separate leaf node of the hierarchical tree in a one-to-one relationship, the hierarchical tree having: (1) a root node associated with an extended library of training images comprised of all of the independent training images used in the training of all of the plurality of AAMs; (2) a plurality of hierarchical levels downward from the root node to each of the leaf nodes, each leaf node being the terminal node (i.e. bottom-most node) in a link-path from the root node to each leaf node, and with each inner node along each link-path from the root node to each leaf node being a parent node having a left child node and a right child node; (3) the extended library being divided progressively into a plurality of smaller groups of training images as one progresses downward from the root node to each leaf node, and each group of training images associated with a leaf node being the distinct group of independent training images used in the training of the leaf node's associated AAM; (4) at each progressive depth level change from a parent node to its left child node and right child node, the parent node's associated group of training images being divided into a two smaller groups, one per left and right child node, according to similarities in characteristic features of the training images, each smaller group being associated with its corresponding child node; (5) each child node having a corresponding node-model-image created from the training images associated with it; and (B) the selecting of an AAM from among the plurality of AAMs in step (b) includes: (i) defining the root node as a current_node; (ii) IF the current_image more closely matches the node-model-image associated with the current_node's left child node than its right child node, THEN redefining the current_node as the left child node, ELSE redefining the current_node as the right child node; (iii) IF the current_node is a leaf node, THEN selecting the AAM associated with the current_node to receive the current_image, ELSE returning to step (ii).

Additionally the training of the plurality of AAMs includes the following steps: (i) accessing an extended training library comprised of all of the independent training images in all of the distinct groups of training images; (ii) arranging all training images in the extended training library into a hierarchical tree structure according to a measure of similarity of pre-defined specific characteristic feature(s) of the training images, the hierarchical tree structure having a root node (i.e. topmost node), a plurality of inner nodes, and a plurality of leaf nodes (i.e. terminal nodes), the inner nodes defining link-paths from the root node to each leaf node, the number of leaf nodes being selected so that the number of training images at each leaf node is not greater than a predefined maximum number; (iii) creating a separate AAM for each leaf node using only the training images associated with each respective leaf node, the collection of thus created AAMs being the plurality of active appearance model processing blocks, AAMs.

In this approach, step (ii) preferably includes: (I) defining the root node and associating with it the entirety of extended training library; (II)

defining the root node as a current_node; (III) defining the a memory pointer current_node_depth as the node depth of the root node; (IV) applying a processing sequence to the current_node to created child nodes, if necessary; (V) IF all nodes at the current_node_depth have not been processed, THEN redefining current_node as a next node not yet processed at current_node_depth and returning to step (IV); (VI) IF there are any other nodes at a depth level below the current_node_depth, THEN incrementing current_node_depth to the next lower depth level, redefining current_node as a next node not yet processed at current_node_depth and returning to step (IV).

Additionally in (IV), the processing sequence includes: IF the number of training images associated with the current_node is not greater than a max_image_count, THEN creating an AAM using only the training images associated with the current_node and defining the current_node as a leaf node and associating the created AAM with the current_node, ELSE: creating a model image using only the training images associated with the current_node, sub-dividing the current_node's associated training images into first and second groups of training images according to similarities in characteristic features of its associated training images, creating a first child node under, and linked to, the current_node, and associating the first group of training images with the first child node, creating a second child node under, and linked to, the current_node, and associating the second group of training images with the second child node.

The above objects are also met in a method of implementing object recognition to recognize a class of object in an input test image, the method comprising: receiving the input test image; providing a plurality of active appearance model processing blocks (AAMs), each of the plurality of AAMs having been trained with a distinct group of independent training images, each training image in all groups of training images having a true example of the class of object with a common, predefined set of characteristic features of the class of object identified and labeled, each group of training images being made distinct by sharing specific traits in select characteristic features distinct from the specific traits in other groups of training images, each of the plurality of AAMs having a corresponding model image and a corresponding statistical model fitting function reflecting the specific traits of the group of training images from which it is trained; implementing the following data processing steps: (a) defining the input test image as a current_image; (b) applying the current_image to a selected AAM selected from among the plurality of AAMs, the selected AAM having a corresponding model image that most closely matches the current_image as compared to the model images corresponding to the not-selected AAMs, the selected AAM processing the current_image to produce an intermediate aligned image; (c) IF a misalignment measure of the intermediate aligned image and a predefined model image is greater than a predefined maximum measure, THEN defining the intermediate aligned image as the current_image and returning to step (b), ELSE outputting the intermediate aligned image as a successful recognition of the class of object.

In this approach, in step (c), within the IF statement, the predefined model image is the selected AAM's corresponding model image. Alternatively in step (c), within the IF statement, the predefined model image is a model image created from a combination of all the groups of training images used to train all of the plurality of AAMs. Still alternatively in step (c), the IF statement further includes: AND IF step (b) has been executed less than a fixed, maximum cycle count. Preferably in step (c), the IF statement further includes: AND IF the misalignment measure is smaller than the misalignment measure obtained in an immediately previous application of step (b).

Also in step (b), the selected AAM has a statistical model fitting function whose reflected specific traits most closely match the same traits on the current_image. In step (b), a misalignment measure of the current_image and the model image corresponding to the selected AAM is smaller than a misalignment measure of the current_image and the model images corresponding to all other of the plurality of AAMs.

In this approach, it is preferred that: (A) the plurality of AAMs are accessible through a hierarchical tree path with a separate one of the plurality of AAMs being associated with a corresponding separate leaf node of the hierarchical tree in a one-to-one relationship, the hierarchical tree having: (1) a root node associated with an extended library of training images comprised of all of the independent training images used in the training of all of the plurality of AAMs; (2) a plurality of hierarchical levels downward from the root node to each of the leaf nodes, each leaf node being the terminal node (i.e. bottom-most node) in a link-path from the root node to each leaf node, and with each inner node along each link-path from the root node to each leaf node being a parent node having a left child node and a right child node; (3) the extended library being divided progressively into a plurality of smaller groups of training images as one progresses downward from the root node to each leaf node, and each group of training images associated with a leaf node being the distinct group of independent training images used in the training of the leaf node's associated AAM; (4) at each progressive depth level change from a parent node to its left child node and right child node, the parent node's associated group of training images being divided into a two smaller groups, one per left and right child node, according to similarities in characteristic features of the training images, each smaller group being associated with its corresponding child node; (5) each child node having a corresponding node-model-image created from the training images associated with it; and (B) the selecting of an AAM from among the plurality of AAMs in step (b) includes: (i) defining the root node as a current_node; (ii) IF the current_image more closely matches the node-model-image associated with the current_node's left child node than its right child node, THEN redefining the current_node as the left child node, ELSE redefining the current_node as the right child node; (iii) IF the current_node is a leaf node, THEN selecting the AAM associated with the current_node to receive the current_image, ELSE returning to step (ii).

In a preferred embodiment, the training of the plurality of AAMs includes the following steps: (i) accessing an extended training library comprised of all of the independent training images in all of the distinct groups of training images; (ii) arranging all training images in the extended training library into a hierarchical tree structure according to a measure of similarity of predefined specific characteristic feature(s) of the training images, the hierarchical tree structure having a root node (i.e. topmost node), a plurality of inner nodes, and a plurality of leaf nodes (i.e. terminal nodes), the inner nodes defining link-paths from the root node to each leaf node, the number of leaf nodes being selected so that the number of training images at each leaf node is not greater than a predefined maximum number; (iii) creating a separate AAM for each leaf node using only the training images associated with each respective leaf node, the collection of thus created AAMs being the plurality of active appearance model processing blocks, AAMs.

Preferably step (ii) includes: (I) defining the root node and associating with it the entirety of extended training library; (II) defining the root node as a current_node; (III) defining the a memory pointer current_node_depth as the node depth of the root node; (IV) applying a processing sequence to the current_node to created child nodes, if necessary; (V) IF all nodes at the current_node_depth have not been processed, THEN redefining current_node as a next node not yet processed at current_node_depth and returning to step (IV); (VI) IF there are any other nodes at a depth level below the current_node_depth, THEN incrementing current_node_depth to the next lower depth level, redefining current_node as a next node not yet processed at current_node_depth and returning to step (IV).

Further preferably in step (IV) the processing sequence includes: IF the number of training images associated with the current_node is not greater than a max_image_count, THEN creating an AAM using only the training images associated with the current_node and defining the current_node as a leaf node and associating the created AAM with the current_node, ELSE: creating a model image using only the training images associated with the current_node, sub-dividing the current_node's associated training images into first and second groups of training images according to similarities in characteristic features of its associated training images, creating a first child node under, and linked to, the current_node, and associating the first group of training images with the first child node, creating a second child node under, and linked to, the current_node, and associating the second group of training images with the second child node.

The above objects are also met in a method of implementing an active appearance model for recognition of a class of object in an input test image, the method comprising: (i) accessing an extended training library comprised of a plurality of independent training images, each training image having a true example of the class of object with a common, predefined set of characteristic features of the class of object identified and labeled; (ii) arranging all training images in the extended training library into a hierarchical tree structure according to similarities in predefined specific characteristic feature(s) of the training images, the hierarchical tree structure having a root node (i.e. topmost node), a plurality of inner nodes, and a plurality of leaf nodes (i.e. terminal nodes), the inner nodes defining link-paths from the root node to each leaf node, with each inner node along each link-path from the root node to each leaf node being a parent node having a left child node and a right child node, at each progressive depth level change within the hierarchical tree from a parent node to its left child node and right child node, the parent node's associated group of training images being divided into a two smaller groups, one per left and right child node, according to similarities in characteristic features of the training images, each smaller group of training images being associated with its corresponding child node, each child node having a corresponding node-model-image created from its associated training images, the number of leaf nodes being selected so that the number of training images at each leaf node is not greater than a predefined maximum number, the training images at each leaf node sharing specific traits in select characteristic features distinct from the specific traits in the training images at other leaf nodes; (iii) creating a plurality of active appearance model, AAM, blocks, one per each leaf node using only the training images associated with each respective leaf node, each of the plurality of AAM blocks having a corresponding model image and a corresponding statistical model fitting function reflecting the specific traits of the training images from which it is trained; (iv) implementing the following data processing steps: (a) defining the input test image as a current_image; (b) applying the current_image to a selected AAM block selected from among the plurality of AAM blocks, the selected AAM block having a corresponding model image that most closely matches the current_image as compared to the model images corresponding to the not-selected AAM blocks, the selected AAM block processing the current_image to produce an intermediate aligned image; (c) IF a misalignment measure of the intermediate aligned image and a predefined model image is greater than a predefined maximum measure, THEN defining the intermediate aligned image as the current_image and returning to step (b), ELSE outputting the intermediate aligned image as a successful recognition of the class of object.

Using this method, step (ii) may include: (I) defining the root node and associating with it the entirety of extended training library; (II) defining the root node as a current_node; (III) defining the a memory pointer current_node_depth as the node depth of the root node; (IV) applying a processing sequence to the current_node to created child nodes, if necessary; (V) IF all nodes at the current_node_depth have not been processed, THEN redefining current_node as a next node not yet processed at current_node_depth and returning to step (IV); (VI) IF there are any other nodes at a depth level below the current_node_depth, THEN incrementing current_node_depth to the next lower depth level, redefining current_node as a next node not yet processed at current_node_depth and returning to step (IV).

Preferably in (IV), the processing sequence includes: IF the number of training images associated with the current_node is not greater than a max_image_count, THEN defining the current_node as a leaf, ELSE: creating a model image using only the training images associated with the current_node, sub-dividing the current_node's associated training images into first and second groups of training images according to similarities in characteristic features of its associated training images, creating a first child node under, and linked to, the current_node, and associating the first group of training images with the first child node, creating a second child node under, and linked to, the current_node, and associating the second group of training images with the second child node.

In this method, preferably in step (c), within the IF statement, the predefined model image is the selected AAM block's corresponding model image. Alternatively in step (c), within the IF statement, the predefined model image is a model image created from a combination of all the groups of training images used to train all of the plurality of AAM blocks. Further alternatively in step (c), the IF statement further includes: AND IF step (b) has been executed less than a fixed, maximum cycle count.

Also in this method, in processing step (b), the selected AAM block is selected according to the following sub-step: (i) defining the root node as a current_node; (ii) IF the current_image more closely matches the node-model-image associated with the current_node's left child node than its right child node, THEN redefining the current_node as the left child node, ELSE redefining the current_node as the right child node; (iii) IF the current_node is a leaf node, THEN selecting the AAM block associated with the current_node to receive the current_image, ELSE returning to sub-step (ii).

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
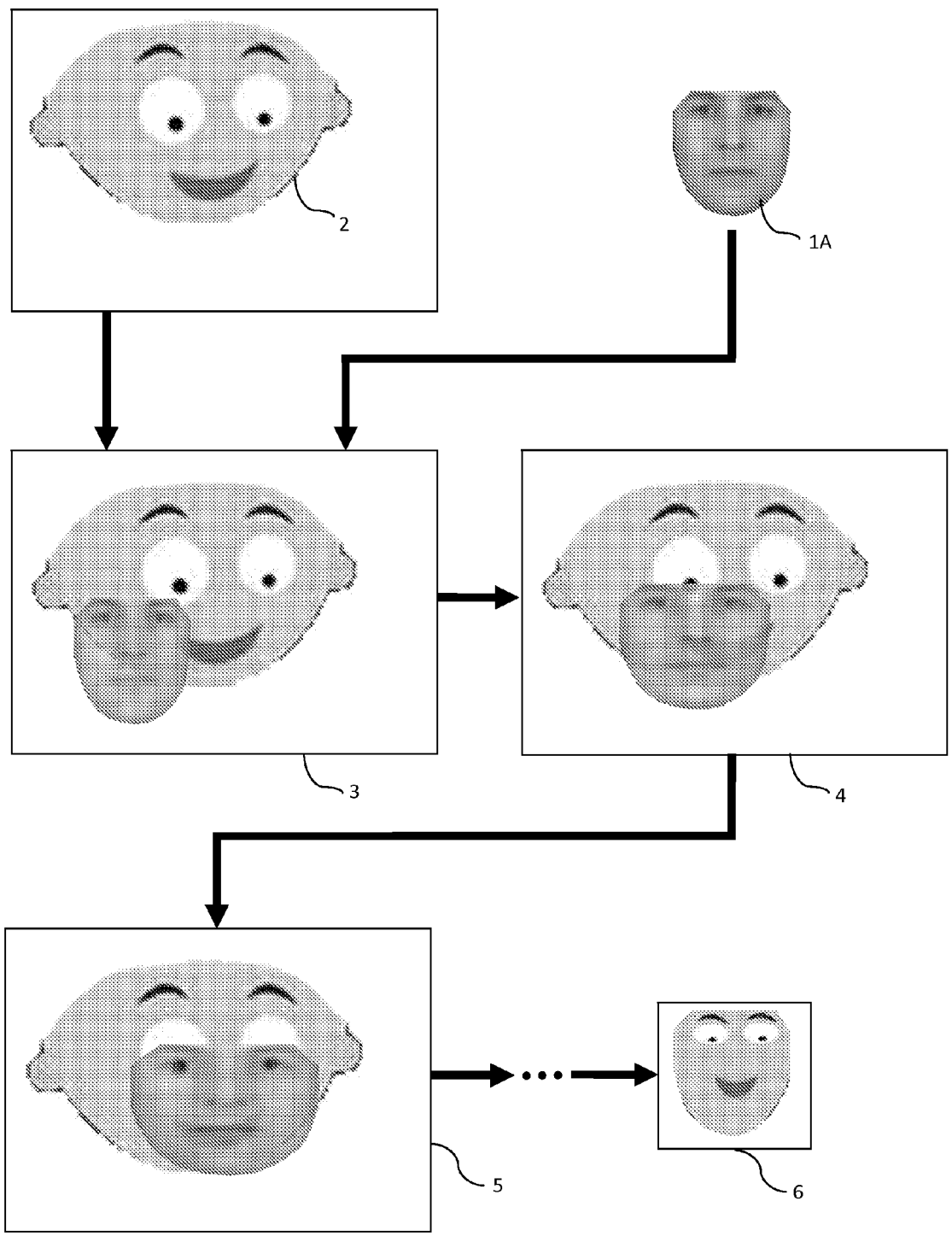
FIG. 1 shows an example of a fitting operation to fit a model face to an input test face.
Figure 2:
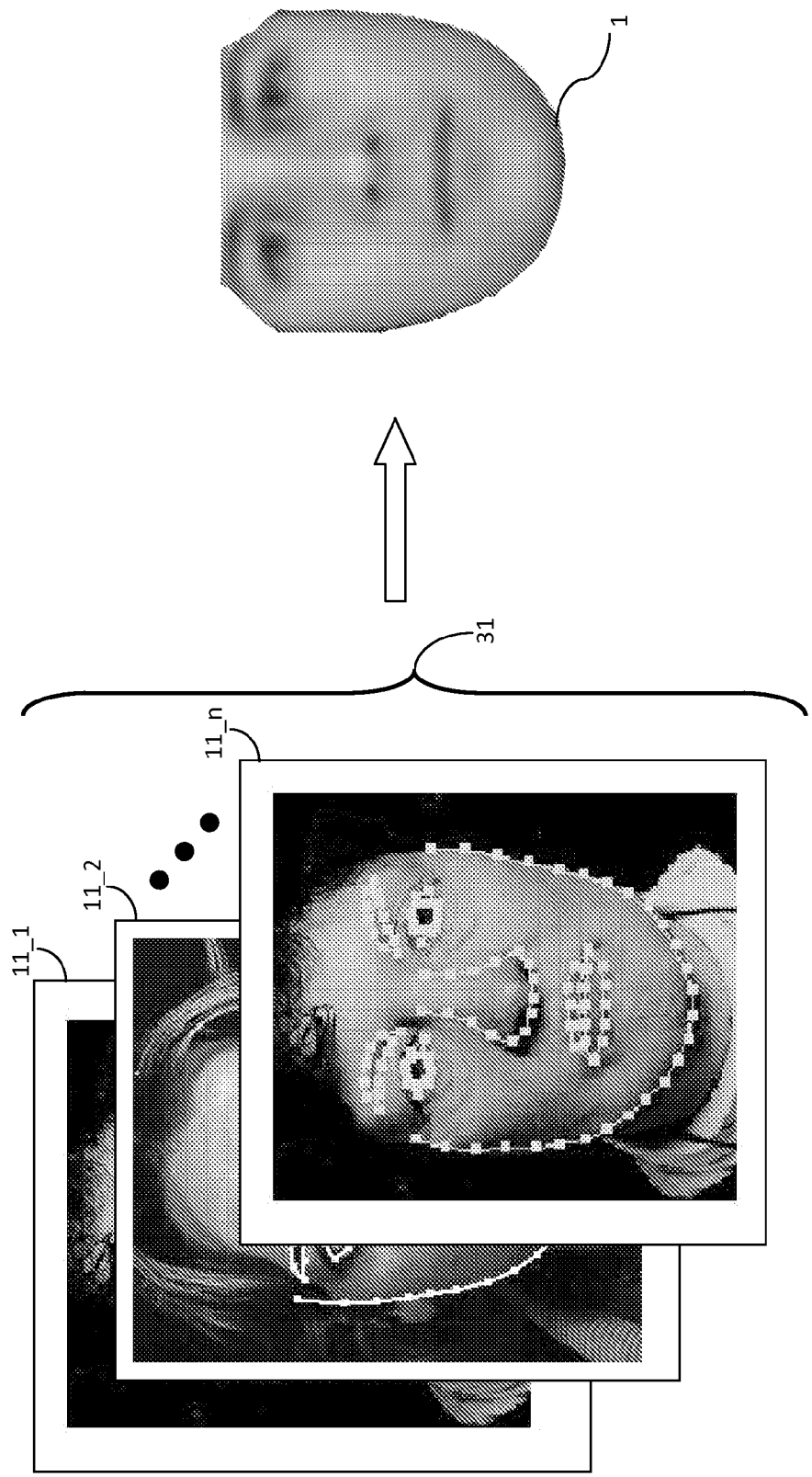
FIG. 2 illustrates the combining of a library of training images in the construction of a model face.
Figure 3:
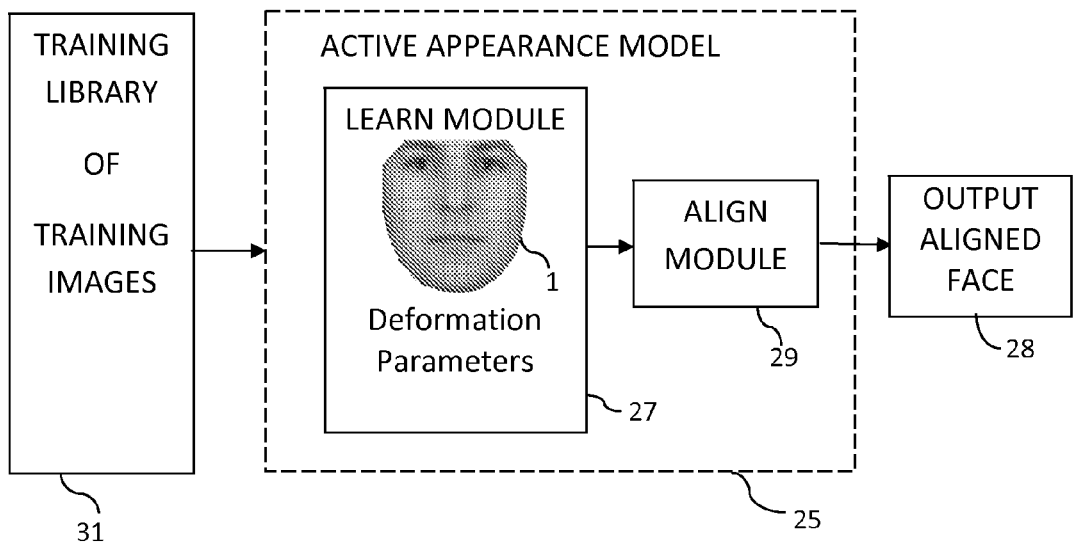
FIG. 3 illustrates the structure of an Active Appearance Model (AAM) machine with access to a training library of training images for training purposes.

With reference to FIGS. 2 and 3, before an Active Appearance Model machine (AAM) 25 may be used, it must first be trained to recognize a specific class of objects. For illustrative purposes, the following discussion will assume that AAM 25 is designed to recognize specific features of a human face, but it is to be understood that the present invention may be applied to any class of object.

A model face 1 may be constructed from a training library 31 of individual training images 11_1 to 11_*n* (i.e. true examples of valid faces). Typically, an individual manually places "landmark" points on each sample face in each training image to outline specific features characteristic to the class of object being represented. The landmark points are ideally selected in such a way that the landmark points outline distinguishable features within the class of object common to every training image.

For instance, a common feature within a human face class may be the eyes. When building a model of the appearance of a human eye in a face training image, landmark points may be placed at the corners of the eyes since these features would be easy to identify in each training image. In addition to the landmark points, however, AAM 25 also makes use of appearance data (i.e. shade data and/or color data and/or texture data, etc.) at various patches (or regions) of each training image to create a distribution range of acceptable appearances for corresponding patches within model face 1. This appearance data constitutes additional features in the overall statistical analysis.

As stated above, Active appearance model machine, AAM, 25 undergoes a training phase before it can be used in an operation phase. In the training phase, AAM 25 creates a model image and statistical model of the class of object it is intended to recognize (i.e., a human face in the present example). In the operation phase, AAM 25 uses the model image and statistical model to search for its specific class of object within an input test image (not shown in FIG. 3).

In this training phase, AAM 25 would have access to a training library 31 of training images (11_1 to 11_n), each of which has an example of the class of object AAM 25 is intended to "learn" to recognize. Since in the present example it is assumed that AAM 25 is being trained to identify a human face class, training library 31 consists of a plurality of true face training images (11_1 to 11_n), each having landmark points outlining characteristic features of a human face subjects. Preferably, training images 11_1 to 11_n are independent of each other (i.e. are not a sequential video capture of a single human subject, but rather are examples of different human subjects and/or having different expressions and/or appearances, etc.). Library 31 may be housed in a memory store internal and/or external to AAM 25.

It is to be understood that AAM machine 25 may be embodied by a computing device and/or data processing device. As it is generally known in the art, such computing devices and data processing devices may include one or more central processing units, arithmetic units, registers, clocks, memories, input/output interfaces, GPU's, ASICs, PLA's, FPLAs, buses, bus interfaces, network connections, controllers, input/output devices, displays, etc.

AAM 25 includes a learn module 27 and an align module 29. In the training phase, learn module 27 goes through training library 31, and uses statistical analysis to create model face 1 by combining information from the training images within training library 31. Preferably, learn module 27 also defines deformation parameters (i.e. variable feature parameters with defined constraints) for a statistical model fitting function defining shape and appearance features of model face 1. Preferably, the deformation parameters are such that they permit the shape and appearance of model face 1 to be warped enough to be aligned with a large percentage of the training images within training library 31.

In the operation phase, align module 29 optimizes the model fitting function to attempt to fit (i.e. warp or align) model face 1 to a possible representation of a human face within an input test image, not shown, and outputs the aligned (i.e. fitted) face 28.

Align module 29 may also be used during the training phase to test the results from learn module 27. In the training face, align module 29 may be used to attempt to warp model face 1 onto all the training images within library 31 (or equivalently warp the training images onto model face 1). This would provide a measure of the effectiveness of the model parameters produced by learn module 27. Typically, align module 29 may successfully align model face 1 to only 90% to 95% of the training images within library 31.

Since in the operation phase, align module 29 may adjust model face 1 to align it with an input test image of a human face, the resultant aligned face 28 is effectively a representation of the input test image having been "warped" (or fitted) onto model face 1. Additionally, since the input test image is fitted onto model face 1, the resultant aligned face 28 will have the same, known size and shape as model face 1, and have its various characteristic shape features (i.e. eyes, pupils, nose, mouth outline, chine, eyebrow, etc.) and appearance features identified, labeled, and mapped (i.e., their locations identified). Aligned face 28 is thus in an ideal state for further processing, if desired.

In the training phase, as is stated above, learn module 27 defines the deformation parameters for a statistical model used to fit, or align, model face 1 to an input test image. An initial step in this process is typically to align the many training images 11_1 to 11_n within training library 31 to establish a range of variation among the characteristic features of the training images. This process typically makes use of the sum of square distances. In other words, an $L_2$-norm approach is typically used to align the many training images within training library 27 during the training phase. This may be roughly thought of as an averaging of the training images within training library 31. The sum of square distances has the advantage of centering the training images so that variations in regions of interest are more equally spaced. An illustrative example of this $L_2$-norm approach is illustrated in FIG. 5 using oval shapes, 51-55.

Figure 5:
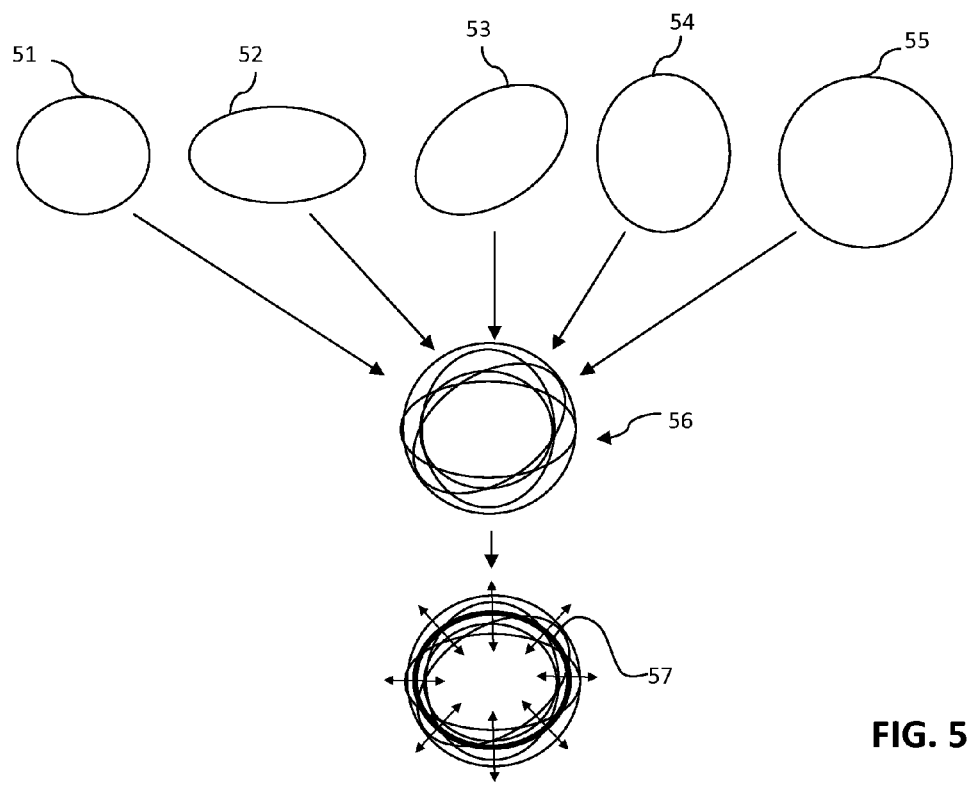
FIG. 5 illustrates the use of an $L_2$-norm approach toward combining multiple shapes.

With reference to FIG. 5, five oval shapes 51-55 are shown for illustrative purposes. Using an $L_2$-norm approach for shape alignment, such as the Procrustes analysis known in the art, effectively centers the ovals into a first cluster 56. An average shape 57 may then be defined. Double-headed arrows illustrate the variations of the different oval shapes 51-55 from the average shape 57.

Figure 6:
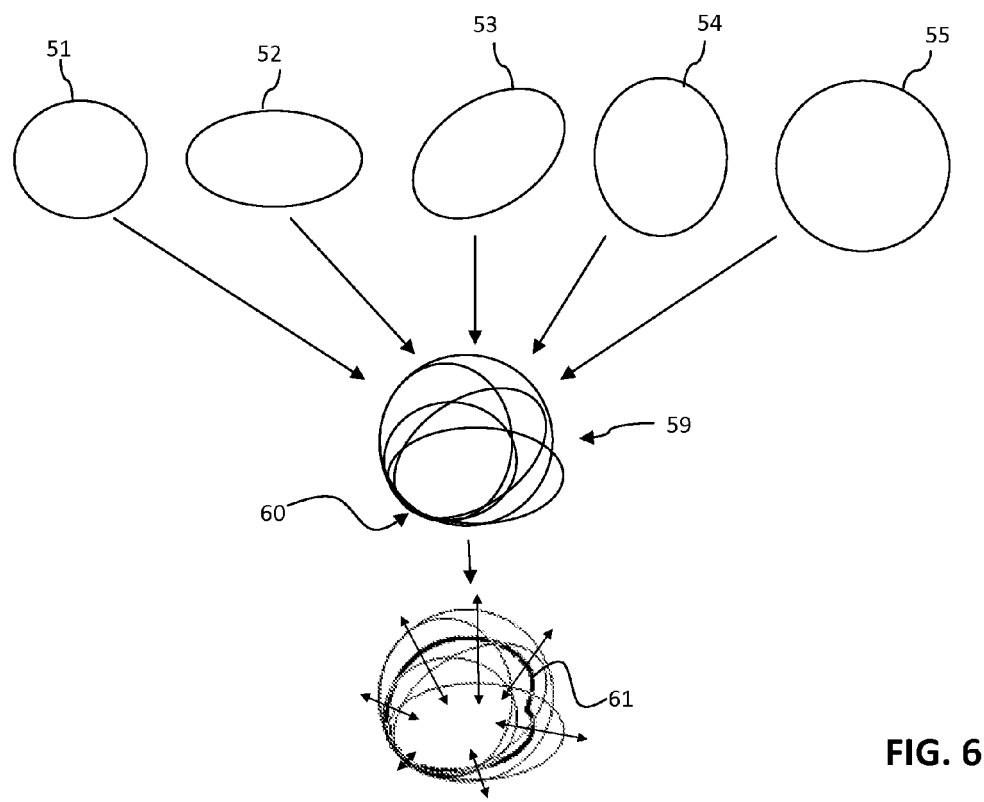
FIG. 6 illustrates the use of an $L_1$-norm approach toward combining multiple shapes.

For comparison purposes, FIG. 6 shows the same oval shapes 51-55, but this time oval shapes 51-55 are aligned using an $L_1$-norm approach. The $L_1$-norm approach attempts to align oval shapes 51-55 along a common edge. As a result, a second cluster 59 with a commonly aligned edge 60 is created. An average shape 61 defined using second cluster 59 is therefore less likely to have shape similar to those of the training shapes, i.e. oval shapes 51-55. Furthermore as is illustrated by the double-headed arrows within FIG. 6, the extremes in variation are likely to be far more pronounced than the approach of FIG. 5, and may range from a very small variation to a very large variation. Consequently, the art generally teaches against the use of an $L_1$-norm approach in favor of an $L_2$-norm approach.

Although not shown, it is to be understood that the averaging of appearance variations among the training images within training library 31 may be similarly accomplished by Procrustes analysis.

Figure 4:
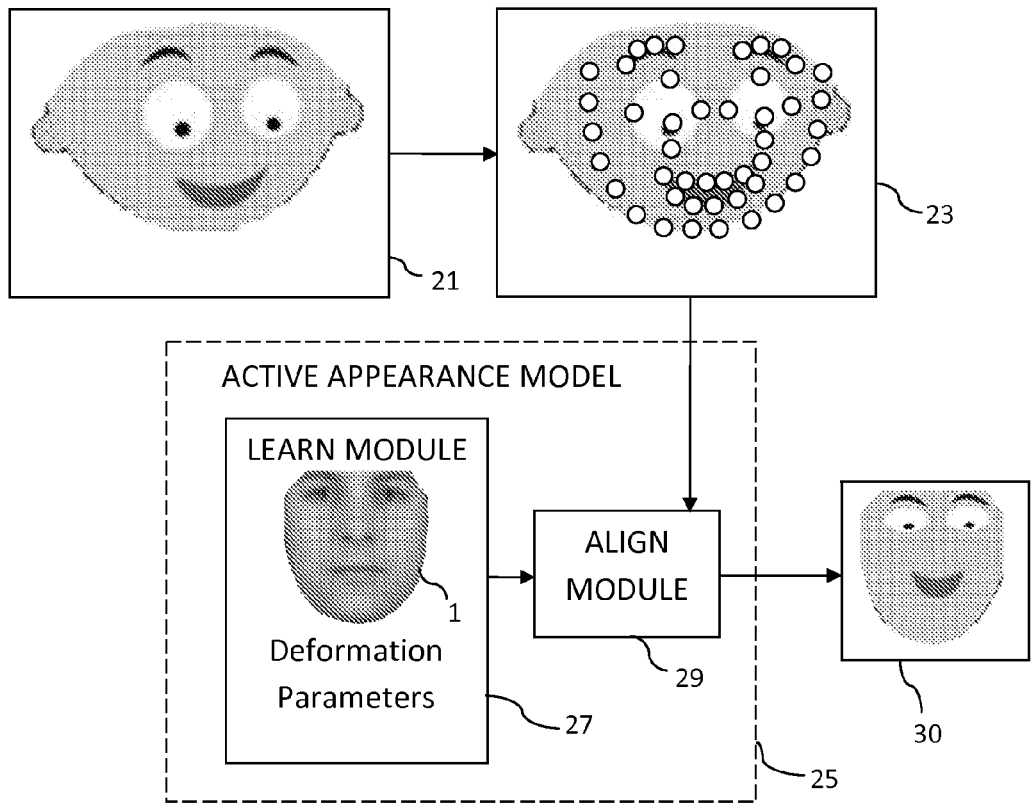
FIG. 4 illustrates an AAM during normal operation.

With reference to FIG. 4, where all elements similar to FIG. 3 have similar reference characters and are described above, the structure of a general AAM 25 in the operation phase may exclude training library 31. This is because the relevant image information from training library 31 would have been captured by the statistical model (and model parameters) defined by learn module 27 in the training phase.

In operation (i.e. in the operation phase), a new input image (i.e. input test image) 21 that is to be submitted to AAM 25 may optionally be preprocessed prior to submission to AAM 25. This preprocessing may include an initial determination of whether an object of the type (i.e. class of object) AAM 25 is trained to recognize (i.e. a human face in the present example) is indeed present within input test image 21. This may be achieved with face detection algorithms, as is generally known in the art. This process may also add at least a few landmark points at some of the more easily identifiable characteristic facial features within input test image 21 to create a preprocessed image 23. Alignment module 29 would receive preprocessed image 23 (or alternatively receive input test image 21, directly) and optimize the model fitting function to attempt to align (i.e. warp or fit) model face 1 to preprocessed image 23, and output an aligned (i.e. fitted) face 30. That is, alignment module 29 searches for the best alignment of model face 1 (including both shape and appearance parameters) its input image (i.e. input test image 21 or preprocessed image 23) by simultaneously minimizing misalignments in shape and appearance.

Figure 7:
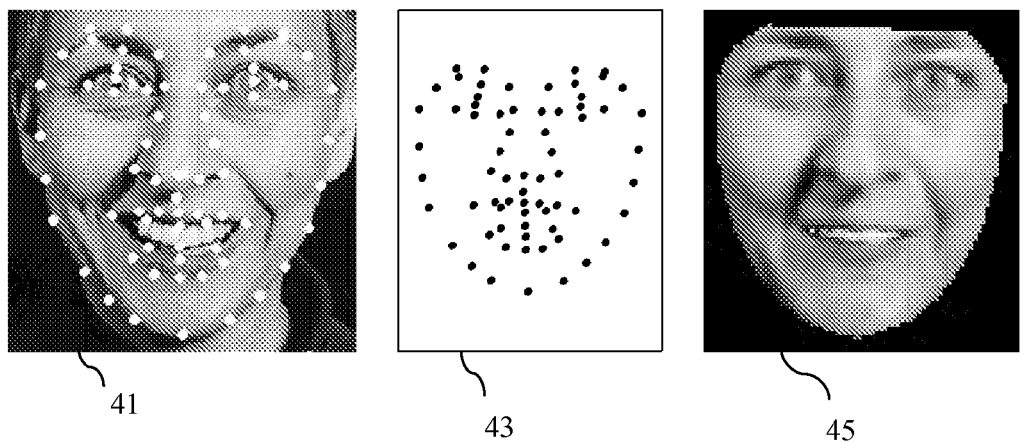
FIG. 7 illustrates an example of alignment of an input image to a model face.

An example of this type of alignment is illustrated in FIG. 7. A preprocessed image 41 is shown with various landmark points highlighting various characteristic features of a human face. For illustration purposes, image 43 illustrates the landmark points alone. The results of aligning a model face, not shown, to preprocess image 41 is output fitted face 45. Note that both shape and appearance features are aligned, or fitted, in output fitted face 45.

Figure 8:
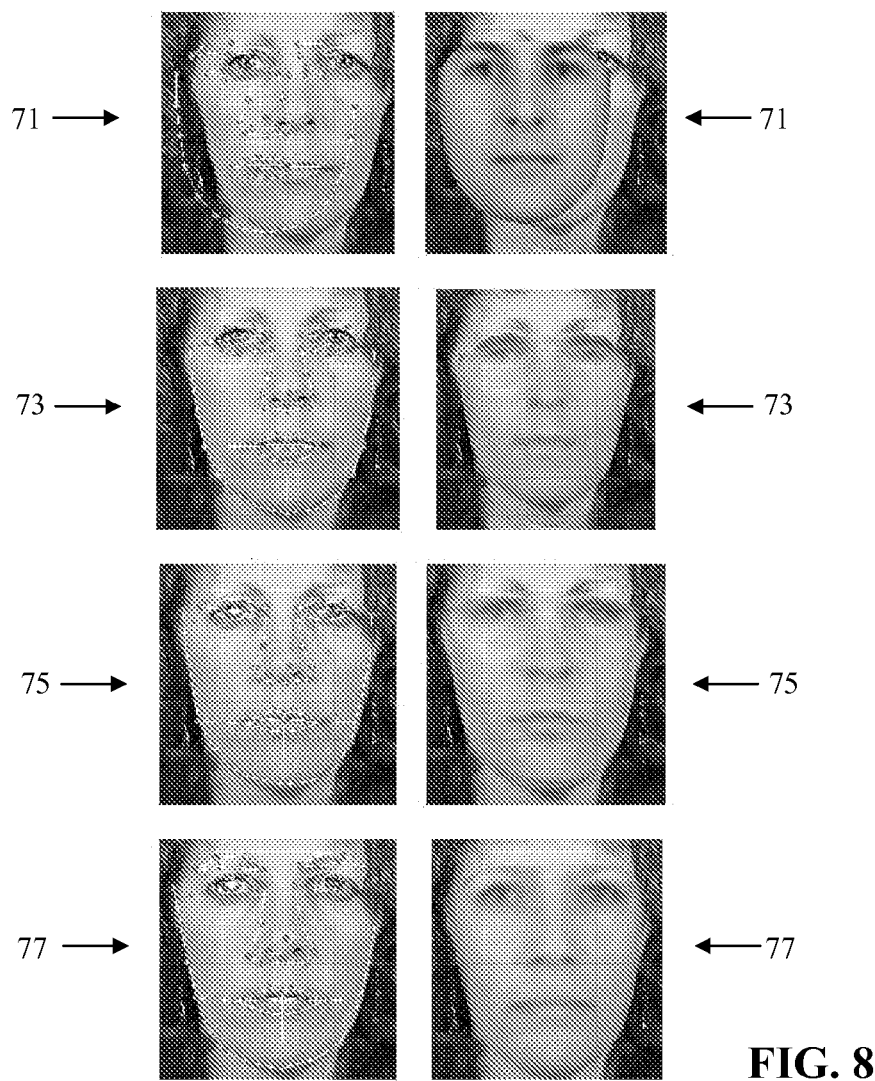
FIG. 8 illustrates some of the stages in an iterative process for aligning an input image to a model face.

As an additional example, four image pairs 71-77 illustrating various stages in an alignment process of a model face onto an input test image are illustrated in FIG. 8. Within each image pair, the left image illustrates the model face shape alignment highlighted by landmark points, and the right image illustrates both the shape and appearance alignment of the model face onto the input image. Image pair 71 illustrates an initial position of the model face on the input image. Image pair 73 illustrates the result of an unconstrained AAM search. Image pair 75 shows the results of having the right eye center constrained, and image pair 77 shows the results of having the right eye center and left eyebrow fixed. As the error is minimized, the model face is better aligned to the input test image, as is illustrated by image pair 77.

A detailed explanation of the statistical optimization within the alignment process is beyond the scope of the present paper, but a quick overview is presented herein for reference purposes. The alignment process is an iterative process with small improvements in optimization obtained it each iteration. Typically, the iterative process ends when no further improvement, or no improvement greater than a pre-defined minimum threshold, can be achieved. Typically, alignment module 29 would use an $L_2$-norm approach for alignment.

If a shape is described by n points in d dimensions, then the shape may be represented by an nd element vector formed by concatenating the elements of the individual point position vectors. For instance, in a 2-dimensional (2-D) image, one can represent the n landmark points, $\{(x_i, y_i)\}$, for a single example as a 2n element vector, x, where $x=(x_1, \ldots, x_n, y_1, \ldots, y_n)$. Given i training images, one would generate i such vectors. The sample images would then be aligned, as described above. To simplify the problem, the dimensionality of the data is preferably reduced from nd to something more manageable. Typically, this is achieved by applying Principal Component Analysis (PCA) to the data. The data form a cloud of points in the nd-dimensional space. PCA computes the main axes of this cloud, allowing one to approximate any of the original points using a model with fewer than nd parameters. The result is a linear model of the shape variation of the object samples.

To create a complete image of an object or structure, both its shape and its appearance (i.e., the pattern of light intensity and/or color variation across the region of the object) need to be modeled. To build a statistical model of the appearance over an image patch, each training image is warped so that its control points match the mean shape (i.e. model face). This may be done using triangulation, as it is known in the art. The intensity information is then sampled from a shape-normalized image over the region covered by the mean shape to form an appearance vector.

Figure 9:
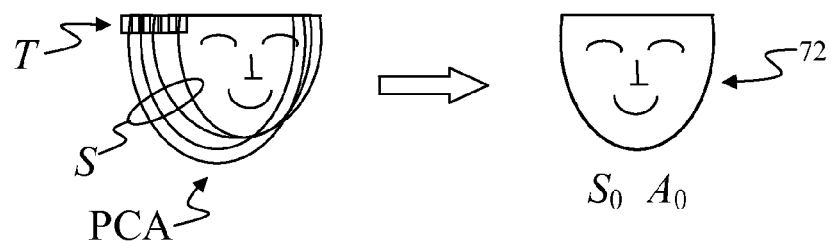
FIGS. 9 and 10 illustrate an alignment process by means of a statistical model fitting function.

For example in FIG. 9, $S_0$ and $A_0$ may define the shape and appearance of a model face 72. Through PCA, one may obtain S, a measure of shape variation, and T, a measure of appearance variation. A misalignment in shape, S', may thus be defined as $S'=S-S_0$. Since PCA(S') produces an array of eigenvalues, this may be described as $P\lambda_s$, where P is an eigenvector and $\lambda_s$ is the projection coefficients. Using this notation, $S=S_0+\lambda_s$. Similarly, a misalignment in appearance T' may be defined as $T'=T-A_0$. Again, PCA(T') produces an array of eigenvalues, which may be described as $A\lambda_\alpha$, where A is an eigenvector and $\lambda_\alpha$ is the projection coefficients. Using this notation, $T=A_0+A\lambda_\alpha$.

Figure 10:
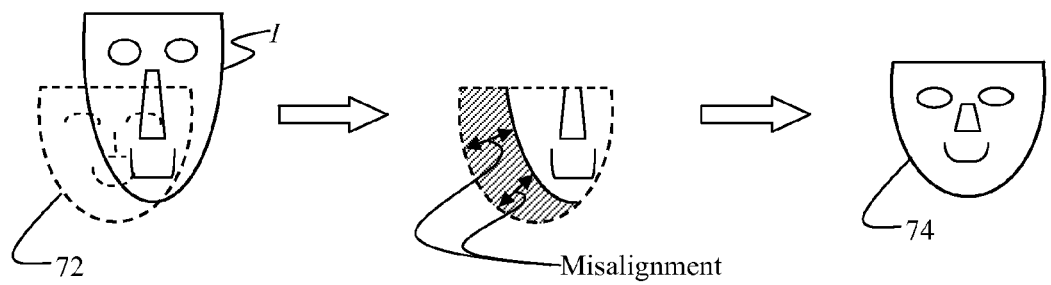

FIG. 10 illustrates an alignment process, such as may be implemented as part of an iteration. Model face 72 is first placed on an input test image I. The portion of the input image I that lies within the boundary of the model face 72 is identified, and the shape misalignment is defined by function W(I; p), where p are the coefficients that correspond to eigenvectors in P. An alignment objective may then be defined as:

$$\min_{\lambda, p} \|(A_O + A\lambda) - W(I; p)\|$$

After multiple iterations, the alignment is optimized resulting in an aligned output face 74.

As stated above, to align a model face, one typically uses an $L_2$-norm approach. This is may be termed an $L_2$-AAM. Applicants have found, however, that a more robust alignment is achievable using an $L_1$-norm approach, which is herein termed an $L_1$-AAM.

The objective is to use $L_1$ minimization to compute an AAM parameter update during each iteration. This is achieved by re-expressing the $L_2$ objective as an $L_1$ minimization problem. Each iteration updates a shape parameter p and an appearance parameter $\lambda$. A benefit of using an $L_1$-norm minimization approach is that the optimal solution will result in a sparse error vector $E=(A\lambda-I)$, where A is the appearance base (i.e. current iteration of the model face) and I is the input image to be aligned (i.e. input test image or preprocessed input test image) warped to the shape-normalized model, as it is known in the art.

An $L_2$-AAM may define its objective as:

$$\min_{\Delta p, \Delta\lambda} \left| A_O + A\lambda + [SD \quad A]C(\lambda)\begin{bmatrix}\Delta p \\ \Delta\lambda\end{bmatrix} \Delta p - I(p) \right|_{l_2}$$

This objective may be re-defined as an $L_1$-AAM, as follows:

$$\min_{\Delta p, \Delta\lambda} \left| A\lambda + [SD \quad A]C(\lambda)\begin{bmatrix}\Delta p \\ \Delta\lambda\end{bmatrix} \Delta p - I(p) \right|_{l_1}$$

where $A_0$=the mean appearance; $(A_0+A\lambda)$=the reconstruction of the face; SD=a steepest descent matrix for shape coefficients; A=appearance bases (eigenvectors); $C(\lambda)$=coefficient matrix dependent on current appearance parameters; p, $\Delta p$=shape projection coefficients and update; $\lambda$, $\Delta\lambda$=appearance projection coefficients and update; and I(p)=appearance extracted from image based on current shape parameters. In essence, the $L_1$-AAM minimizes with respect to the $L_1$-norm (i.e. $l_1$), whereas the $L_2$-AAM minimizes with respect to $L_2$-norm (i.e. $l_2$).

A basic difference between the two approaches is that the $L_2$-norm is robust to Gaussian noise, whereas the $L_1$-norm is robust to outlier noise. That is, the $L_1$-norm can handle occlusions and extraneous artifacts better. The Appearance bases, A, in the $L_1$-norm formulation should ideally be computed by $L_1$-decomposition of training data.

To reiterate some of the benefits of the present $L_1$-AAM machine, the solution to the $L_1$-AAM minimizer finds a sparser solution than the $L_2$-norm. Consequently, the solution, x, to $$\min_x |y - Ax|_{l_1}$$

should result in a sparse error, E=y−Ax. Additionally, in order to improve the performance, the appearance basis should be computed by $L_1$-decomposition.

Figure 12A:
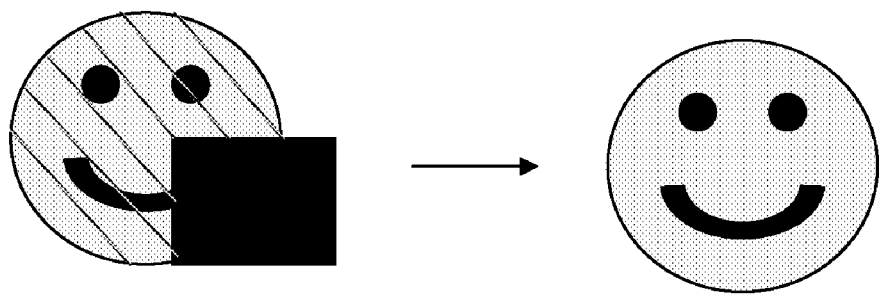
FIGS. 12A-12C illustrates some advantages of an $L_1$-AAM machine.
Figure 12B:
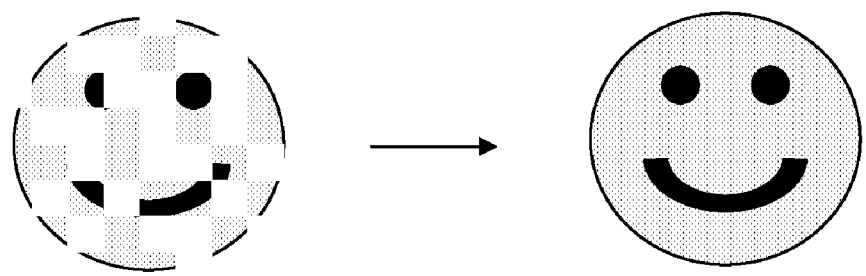
Figure 12C:
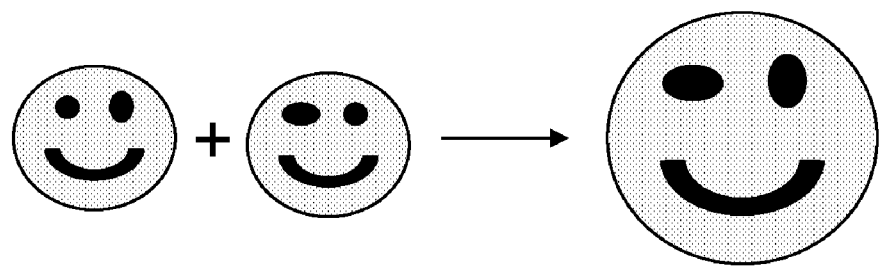

A visual illustration of these advantages is shown in FIGS. 12A-12C. FIG. 12A shows that $L_1$-norm is robust to occlusions, and naturally handles outliers. FIG. 12B shows that $L_1$-norm can further handle smaller model sizes (or sub-sampled model pixels) and thus achieve faster alignment. FIG. 12C illustrates that in an $L_1$-AAM, similar objects are represented very well by the appearance bases.

Figure 11:
FIG. 11 illustrates two examples of poorly aligned model faces.
Figure 11:
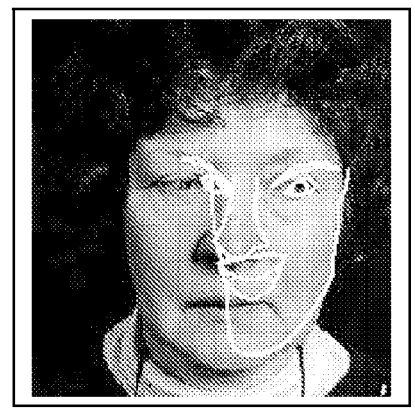

As is explained above in reference to FIG. 4, the active appearance model 25 produces an aligned face 30. However, it is not guaranteed that the produced align face 30 will be a true representation of a plausible face (i.e. a realistic example of a true face). Various circumstances, such as a poor starting position of the model face during the alignment process may result in poor alignment, and outputting an untrue face as a true aligned face. Examples of poorly aligned model faces are shown in FIG. 11. In both examples of FIG. 11, the model face is aligned to half of the input test image, resulting in a distorted, untrue face, as indicated by the light face outline.

In order to avoid outputting an untrue, aligned face, it is presently proposed that a standard AAM machine be modified to incorporate a canonical face classifier to verify the validity of an aligned face produced by align unit 29 before the produced aligned face is sent to the AAM machine's output. It is to be understood that a canonical face classifier is proposed because the class of object that the AAM of the present example is trained to recognize is a human face class. However in general, when an AAM machine is trained to processes an image of any particular class of object, the classifier would be a canonical class classifier trained to determining if the aligned image produced by the align module is a true representation of the particular class of object.

Figure 13:
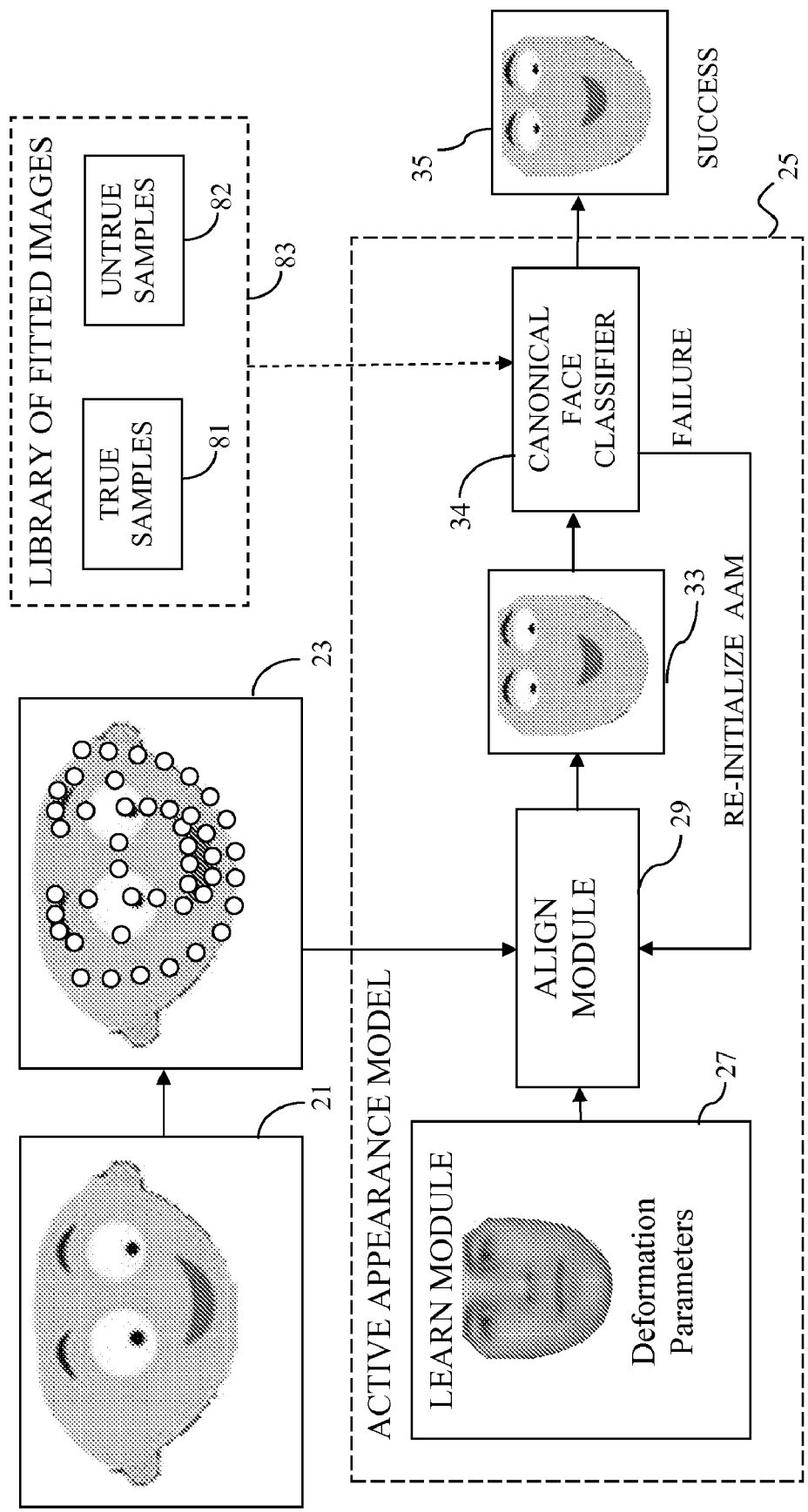
FIG. 13 illustrates an AAM modified to incorporate a canonical face classifier.

With reference to FIG. 13, where all elements similar to those of FIGS. 3 and 4 have similar reference characters and are explained above, the present AAM 25 incorporates a canonical face classifier 34, which receives the aligned face 33 output from align module 29 and classifies it as a true face or an untrue face. If canonical face classifier 34 classifies aligned face 33 as a true face, then the alignment is deemed a success and aligned face 33 is output as output image 35 from AAM 25. If canonical face classifier 34 classifies aligned face 33 as an untrue face, then the alignment is deemed a failure and the AAM alignment is stopped or re-initialized, i.e. the next input image is acquired. For example, if the present AAM 25 is in a system that tracks the movement of a face, and AAM 25 fails to accurately align an initially captured image from a human subject, then the re-initialization of AAM 25 would include capturing a new image of the human subject and re-attempting the alignment process.

As it is known in the art, a classifier, such as canonical face classifier 34, is trained by means of a library 83 having a plurality of true samples 81 (i.e. samples of true faces in the present example) and a plurality of untrue samples 82 (i.e. samples of untrue faces). Ideally, after reviewing the true and untrue samples of library 83, canonical face classifier 34 would identify characteristics by which it may distinguish true faces from untrue faces.

In a preferred embodiment, the training images within training library 31 (see FIG. 3) are used in the construction of library 83. That is, the true samples 81 would be comprised of (or at least partially include) training images 11_1 to 11_n from training library 31, and the untrue samples 82 would be constructed by introducing distortions into the training images of training library 31. A benefit of this approach is that the characteristic features within training images 11_1 to 11_n have previously been manually identified and demarcated (see FIG. 2), so that during the training of canonical face classifier 34, it is more likely (or even assured) that canonical face classifier 34 will focus on the identified characteristic features of the particular class of object.

Further preferably, AAM 25 is used in the construction of library 83. In this case, AAM 25 is used to construct an aligned face of each training image within library 31 (or at least of those to which the model face is successfully aligned). This would result in library 83 being a library of fitted faces (i.e. a library of previously aligned faces). Further preferably, true samples 81 are comprised of true fitted faces and untrue samples 82 are comprised of true fitted faces that have been distorted but which maintain the same size and perimeter outline as fitted faces. This would further facilitate the training of canonical classifier 34 since all the image within the library of fitted faces 83 (both true samples 81 and untrue samples 82) would have the same size and perimeter outline as model face 1 and as aligned face 33 produced by align module 29.

Since in normal operation, canonical face classifier 34 examines aligned face 33 output from align module 29, having trained canonical classifier 34 on a library 83 of fitted faces having the same size and perimeter outline as aligned face 33 further improves the success rate of canonical face classifier 34. That is, the rate at which canonical classifier 34 correctly classifies aligned face 33 as a true face or as an untrue face is improved over training canonical face classifier 34 with a library of unfitted faces.

It is to be understood, however, that any library of suitable training images (not necessarily from training library 31), may be used to train canonical face classifier 34. Nonetheless, it is preferred that the training images 11_1 to 11_n be submitted to AAM 25 to create library of fitted faces 83. After the created fitted faces have been manually approved as true faces to construct a positive training set 81 of true faces, samples of untrue faces are constructed by introducing distortions into the true faces to construct a negative training set 82 of untrue faces. The two training sets 81 and 82 are combined to create the library of fitted faces 83, which is used to train canonical face classifier 34.

Figure 14:
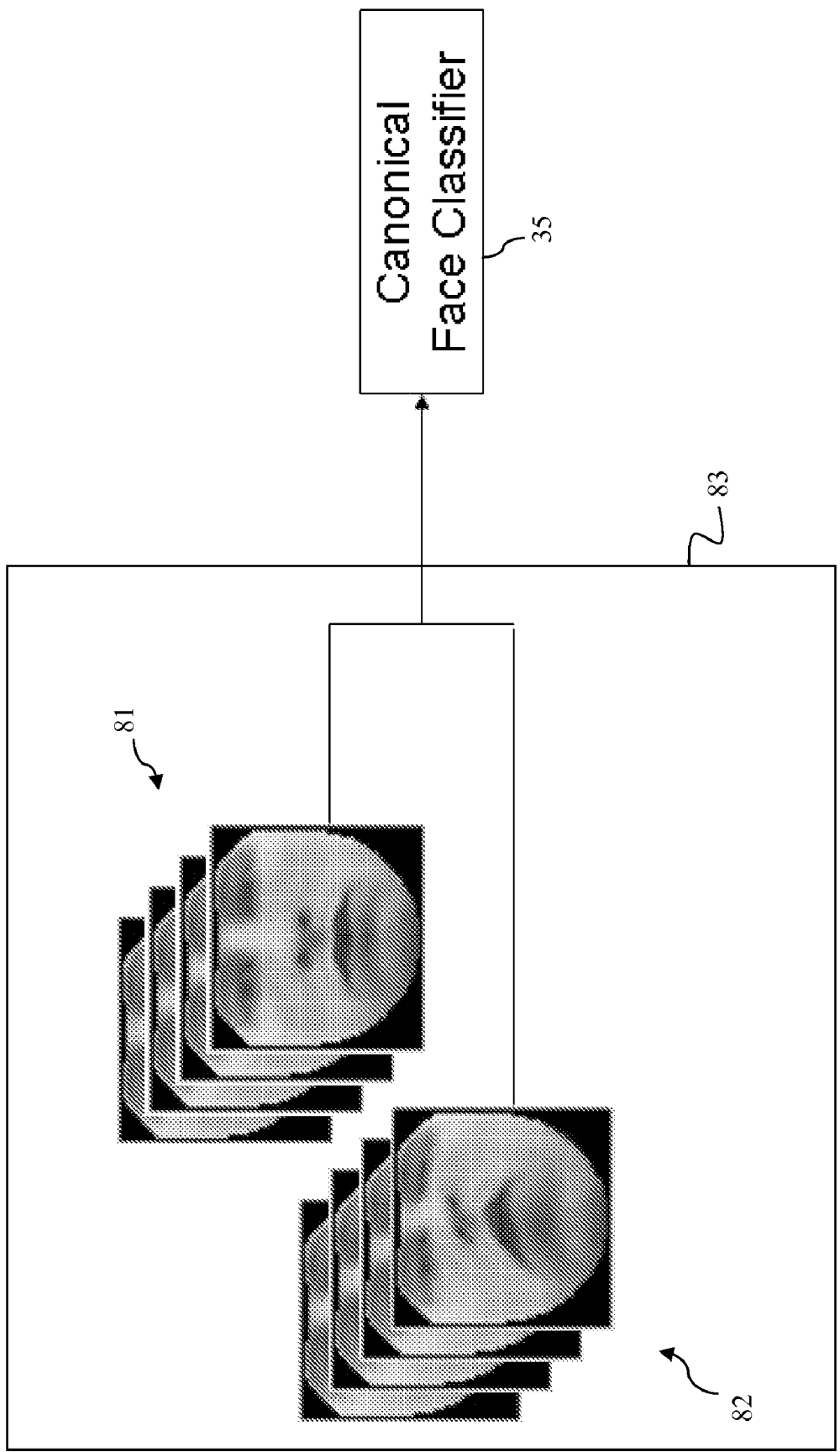
FIG. 14 illustrates a library of training images for training a canonical face classifier.

With reference to FIG. 14, library of fitted faces 83 includes positive training set 81 of true face samples preferably constructed from ground truth, perfectly labeled sample faces, and includes a negative training set 82 of untrue face samples preferably generated by randomly perturbing shape parameters of positive face samples. Further preferably, the perturbations are relative to shape model eigenvalues. Additional untrue samples for negative training set 82 may be created by applying pre-defined translation, scale, and rotation offsets to the positive face samples 81.

It is presently preferred that more negative samples than positive samples be used in the construction of canonical classifier 34. Specifically, a 10:1 ratio of negative to positive training samples is preferred.

Figure 15:
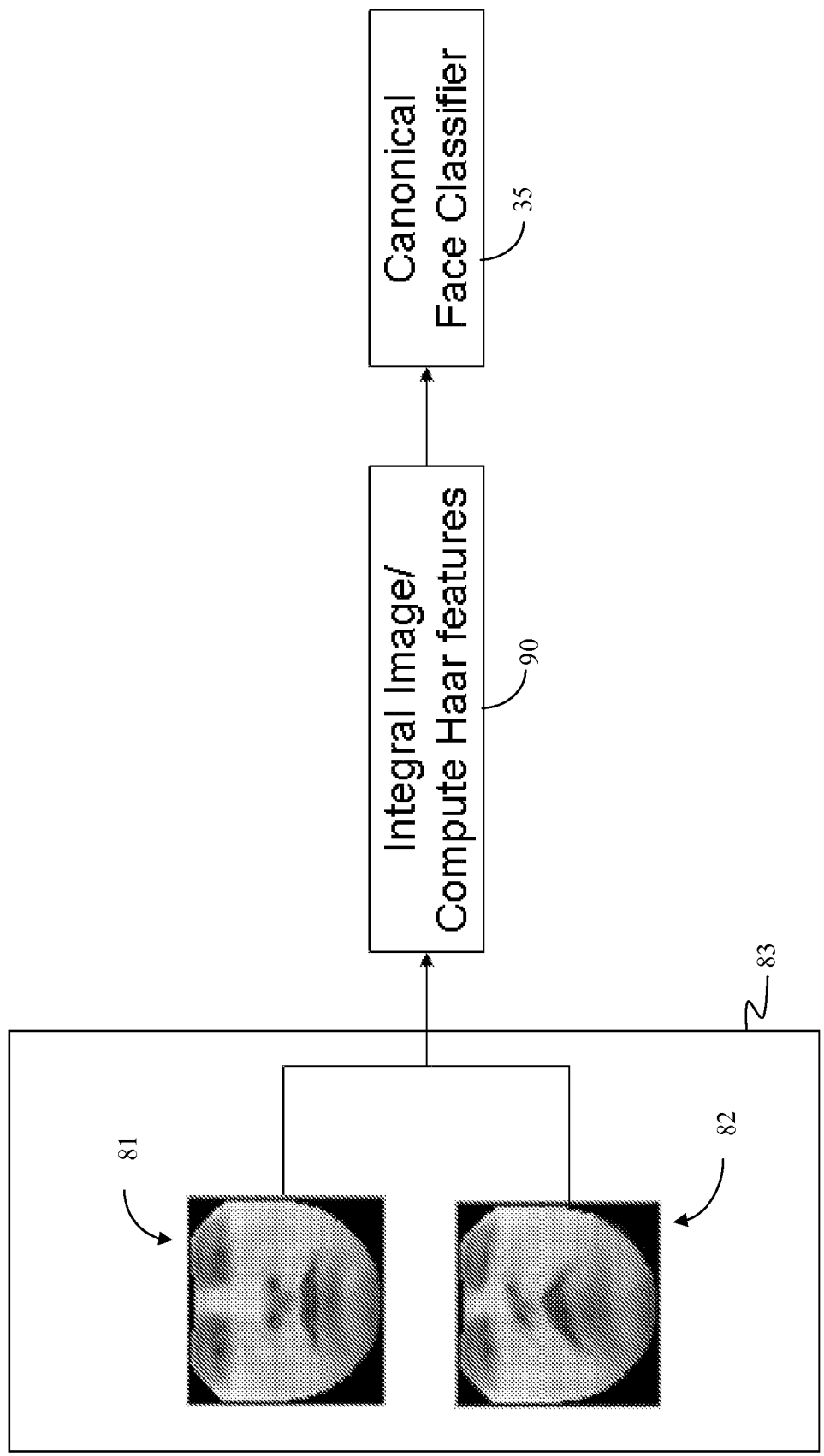
FIG. 15 shows a processing stage for implementing specific types of training techniques for canonical face classifier.

With reference to FIG. 15, where all elements similar to FIGS. 13 and 14 have similar reference characters and are described above, it is presently preferred that a processing stage 90 use Haar features and/or adaboosting, as is known in the art, to train canonical face classifier 34. Alternatively, a support vector machine (SVM) or linear discriminant analysis (LDA) may also be used to create canonical face classifier 34, as it is known in the art. It is to be understood that the specific method of training canonical classifier 34 is not critical to the invention and any technique known in the art of classifier technology and classifier training may be used to train canonical face classifier 34.

It is noted that since aligned face 33, which is output from align module 29, has a pre-defined shape and size, and this facilitates the classification process. That is, the model face 1 (i.e. canonical image) pre-defines the face search size. This improves efficiency since canonical face classifier 34 only needs to consider one scale of the image.

In an alternate embodiment, integral image and cascaded weak classifiers may be used to improve efficiency. This approach may make use of the Viola and Jones face detector, known in the art.

Thus by integrating canonical face classifier 34 in an AAM 25, one can achieve a higher reliability than is possible using the typical AAM alignment error techniques.

The above-described $L_1$-AAM provides for a more robust alignment, and the integration of a canonical face classifier into a general AAM architecture reduces the probability of the AAM producing false-positive outputs (i.e. reduces the possibility that the AAM will produce non-true examples of a class of object).

Another deficiency of a general AAM, as is described above, is that by the nature of the statistical model fitting function used in an AAM, only input images whose subjects lie within a norm of shape and texture defined by the statistical model fitting function may be aligned to the model image.

For example, in the above-described face fitting implementations, learn model 27 creates model face 1 by generally averaging out all the training images within training library 31 (see FIG. 3), and defines a statistical model fitting function designed to fit a majority of possible variations, which define a norm. Samples outside this norm would be rejected. There will, however, always be outliers (i.e. true examples outside the norm) that the statistical model fitting function will not be able to fit. For instance, it is explained above that the defined statistical model fitting function will typically be able to fit only 90% to 95% of the training images within the training library 31, from which the statistical model fitting function is defined.

This problem becomes even more acute as the number of training images is expanded. Training library 31 typically consists of less than a couple of hundred training images. If training library 31 were expanded to comprise thousands (or millions) of training images in an effort to create an AAM capable of recognizing a greater number of true variations, the resultant AAM's statistical model fitting function would be able to fit an even smaller percentage of the training images within the expanded training library 31. This is because the expanded training library 31 would likely include a larger number of outliers (i.e. a larger sample of extreme true examples) that the statistical model fitting function would be unable to fit. Thus, rather than creating a more reliable AAM, the result would technically be a less reliable AAM in terms of the percentage of training images within its expanded training library 31 that it would be able to fit.

The following describes an AAM architecture able to handle and successfully learn from an expanded training library 31, preferably consisting of greater than 1000 independent training images (i.e. images not obtained from a video sequence), and truly not limited by the size of the expanded training library 31. The following architecture is further able to improve the percentage of images within expanded training library 31 that the AAM can successfully fit to any given minimum percentage, up to 100% if desired.

Figure 16:
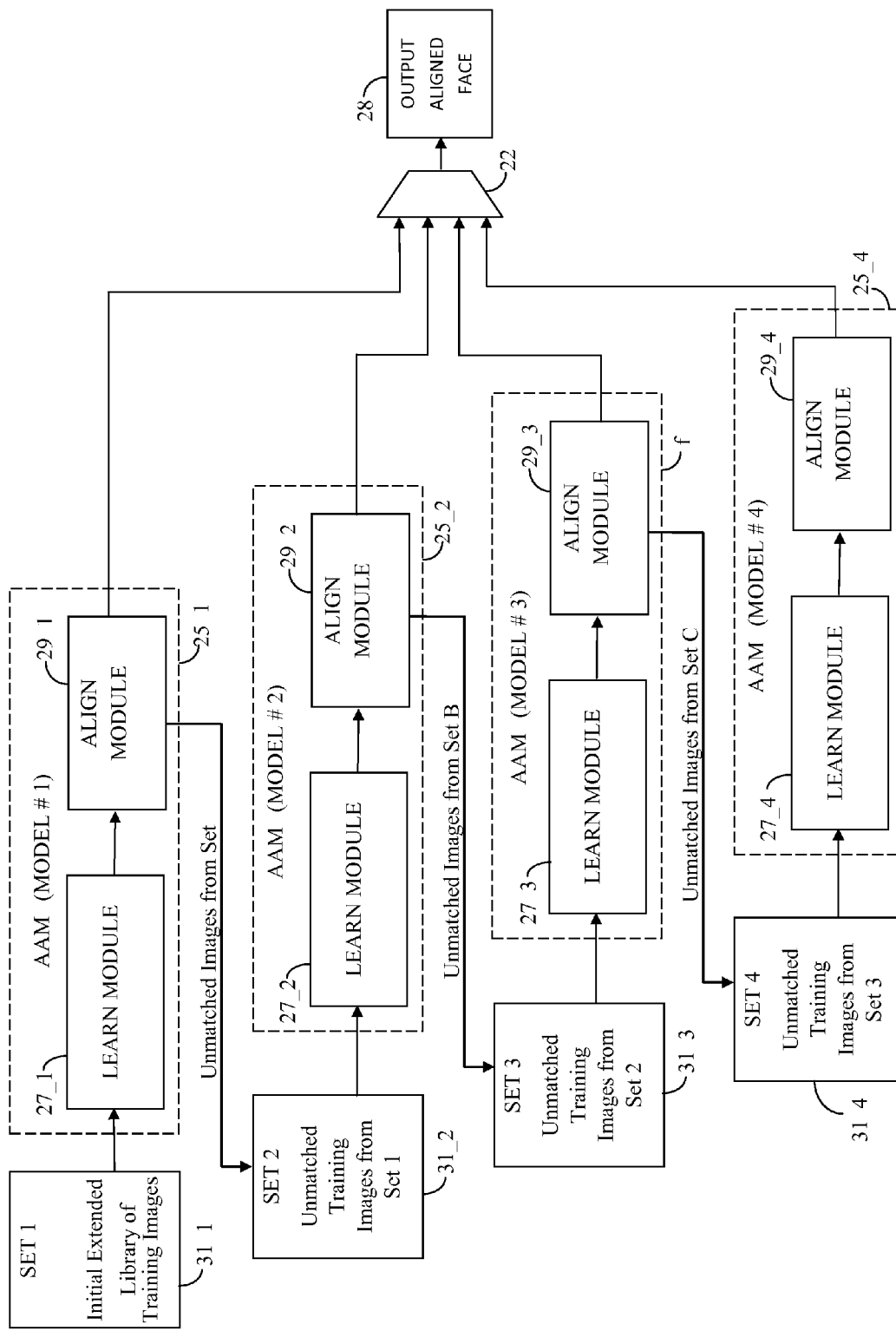
FIG. 16 illustrates an AAM structure (or method) for creating (training) an AAM machine capable of fitting a higher percentage of the images within a training library of training images by means of a plurality of statistical fitting pairs, each pair including a model image and a corresponding statistical model fitting function.

Before describing the presently preferred AAM architecture, it is beneficial to first describe a new method of training the preferred AAM. The present method creates a series of statistical model fitting functions, each of which is based on a fraction of the training images within an expanded library of training images. Although each statistical model fitting function may be constructed, in turn, using the same AAM 25 (i.e. using the same learn and align modules 27 and 29), for the sake of clarity, FIG. 16 illustrates an embodiment with series of AAMs 25_1 to 25_4. It is to be understood that any number of AAMs may be used in the present invention, and that four AAMs are shown purely for illustrative purposes. Each of AAMs 25_1 to 25_4 will produce a respective, distinct model face and corresponding statistical model fitting function, which are herein labeled Model #1 though Model #4 corresponding to AAMs 25_1 to 25_4.

The entire, initial extended library of training images, which is preferably comprised of thousands of sample true images, is gathered into a first set of training images, identified as SET 1 (31_1). Learn Module 27_1 within first AAM 25_1 accesses SET 1 31_1 to create a first model face and first statistical model fitting function (i.e. Model #1). This first model face and first statistical model fitting function constitute a first statistical fitting pair. Align Module 29_1 within AAM 25_1 then attempts to fit each and every sample image within SET 1 using the first statistical fitting pair. That is, Align Module 29_1 attempts to fit and every sample image within SET 1 to the first model face using the first statistical model fitting function. Each sample image that Align Module 29_1 fails to fit is output to a second set of images, SET 2. But each fitted image is output as output aligned image 28.

In the present embodiment, however, since the current AAM is comprised of a plurality of sub-AAMs (25_1 to 25_4), and all share the same output, their respective outputs may go through a multiplexer 25 that selects the output from only the specific sub-AAM that is currently outputting a fitted image.

The second set of images SET 2 constitutes a new library of training images (i.e. a new sub-library), and may be submitted to AAM 25_1 for reprocessing, but for ease of illustration, SET 2 is shown applied to second AAM 25_2. Learn Module 27_2 within first AAM 25_2 accesses SET 2 (31_2) to create a second model face and second statistical model fitting function (i.e. Model #2).

Align Module 29_2 within AAM 25_2 then attempts to fit each and every sample image within SET 2 to the second model face using the second statistical model fitting function. Each sample image that Align Module 29_2 fails to fit is output to a third set of images, SET 3 (31_3). But each fitted image is output as output aligned image 28. This second model face and second statistical model fitting function constitute a second statistical fitting pair. The third set of images SET 3 (31_3) constitutes a new library of training images, and may be submitted to AAM 25_1 for reprocessing, but for ease of illustration, SET 3 is shown applied to third AAM 25_3.

Learn Module 27_3 within third AAM 25_3 accesses SET 3 (31_3) to create a third model face and third statistical model fitting function (i.e. Model #3). This third model face and third statistical model fitting function constitute a third statistical fitting pair. Align Module 29_3 within AAM 25_3 then attempts to fit each and every sample image within SET 3 to the third model face using the third statistical model fitting function. Each sample image that Align Module 29_3 fails to fit is output to a fourth set of images, SET 4 (31_4). But each fitted image is output as output aligned image 28.

The fourth set of images SET 4 (31_4) constitutes a new library of training images (or equivalent a new sub-library), and may be submitted to AAM 25_1 for reprocessing, but like before, SET 4 is shown applied to fourth AAM 25_4 for the sake of illustration. Learn Module 27_4 within fourth AAM 25_4 accesses SET 4 (31_4) to create a fourth model face and fourth statistical model fitting function (i.e. Model #4). This fourth model face and fourth statistical model fitting function constitute a fourth statistical fitting pair. Align Module 29_4 within AAM 25_4 then attempts to fit each and every sample image within SET 4 to the fourth model face using the fourth statistical model fitting function. Each fitted image is output as output aligned image 28. Each sample image that Align Module 29_4 fails to fit may be discarded. However, if further stages of AAMs are desired, then they may be output to a fifth set of images for further processing. It is be understood that the number of stages may be increased until the desired percentage of all images within the initial extended library of training images (SET 1, 31_1) have been fitted.

Figure 17:
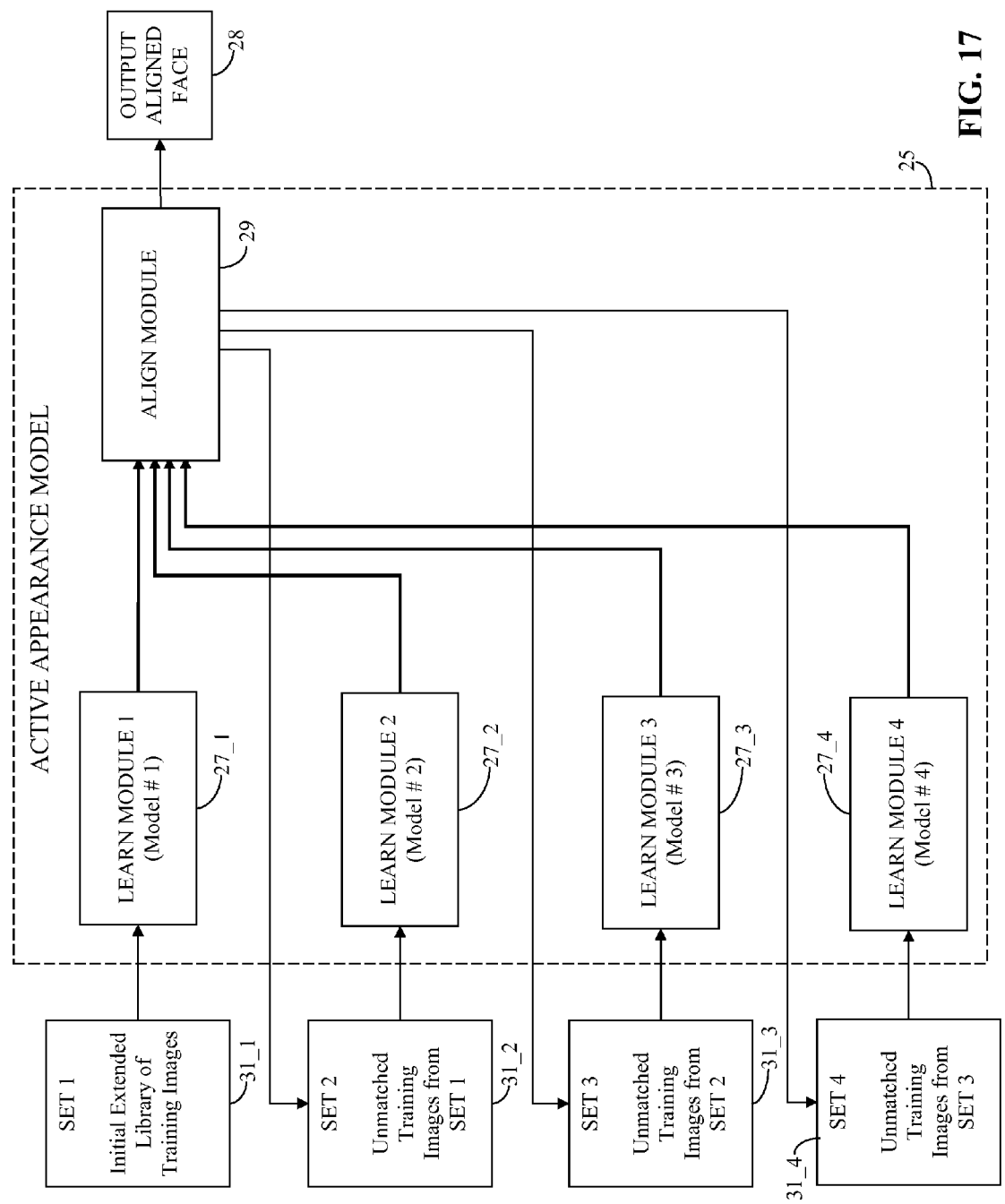
FIG. 17 illustrates an alternate arrangement of the embodiment of FIG. 16.

With reference to FIG. 17, where all elements similar to FIGS. 3, 4 and 16 have similar reference characters and are described above, an alternate embodiment may consist of an AAM 25 with multiple Learn Modules 27_1 to 27_4 sharing a common Align Module 29. Like before, the entire, initial extended library of training images, which is preferably comprised of thousands of sample true images, is gathered into a first set of training images, identified as SET 1 (31_1). Learn Module 27_1 within AAM 25 accesses SET 1 31_1 to create a first model face and corresponding first statistical model fitting function (i.e. Model #1, or equivalently, first statistical fitting pair). Align Module 29 then attempts to fit each and every sample image within SET 1 to the first model face using the first statistical model fitting function. Each fitted image is output as output aligned image 28, and each sample image that Align Module 29 fails to fit is output to second set of images, SET 2 (31_2).

Also like before, second set of image SET 2 constitutes a new library of training images. The second Learn Module 27_2 then accesses SET 2 (31_2) to create a second model face and second statistical model fitting function (i.e. Model #2, or equivalently, second statistical fitting pair). Align Module 29 attempts to fit each and every sample image within SET 2 to the second model face using the second statistical model fitting function. Each fitted image may be output as output aligned image 28, and each sample image that Align Module 29 fails to fit is output to third set of images, SET 2 (31_2).

The third Learn Module 27_3 then accesses SET 3 (31_3) to create third model face and third statistical model fitting function (i.e. Model #3, or equivalently, third statistical fitting pair). Align Module 29 again attempts to fit each and every sample image within SET 3 to the second model face using the second statistical model fitting function, and may output the fitted faces. Each sample image that Align Module 29 fails to fit is used to define the fourth set of images, SET 3 (31_4).

The fourth set of images, SET 4 (31_4), constitutes a new library of training images, and is submitted to Learn Module 27_4 to create a fourth model face and fourth statistical model fitting function (i.e. Model #4, or equivalently, fourth statistical fitting pair). Align Module 29 then attempts to fit each and every sample image within SET 4 to the fourth model face using the fourth statistical model fitting function. Each fitted image may be output as output aligned image 28. Each sample image that Align Module 29_4 fails to fit may be discarded. But also like before, if further stages of Learn Modules are desired, then Align Module 29 may output the image that it cannot fit to a fifth set of images for further processing. It is be understood that the number of Learn Modules may be increased until the desired percentage of all images within the initial extended library of training images (SET 1, 31_1) have been fitted.

Figure 18:
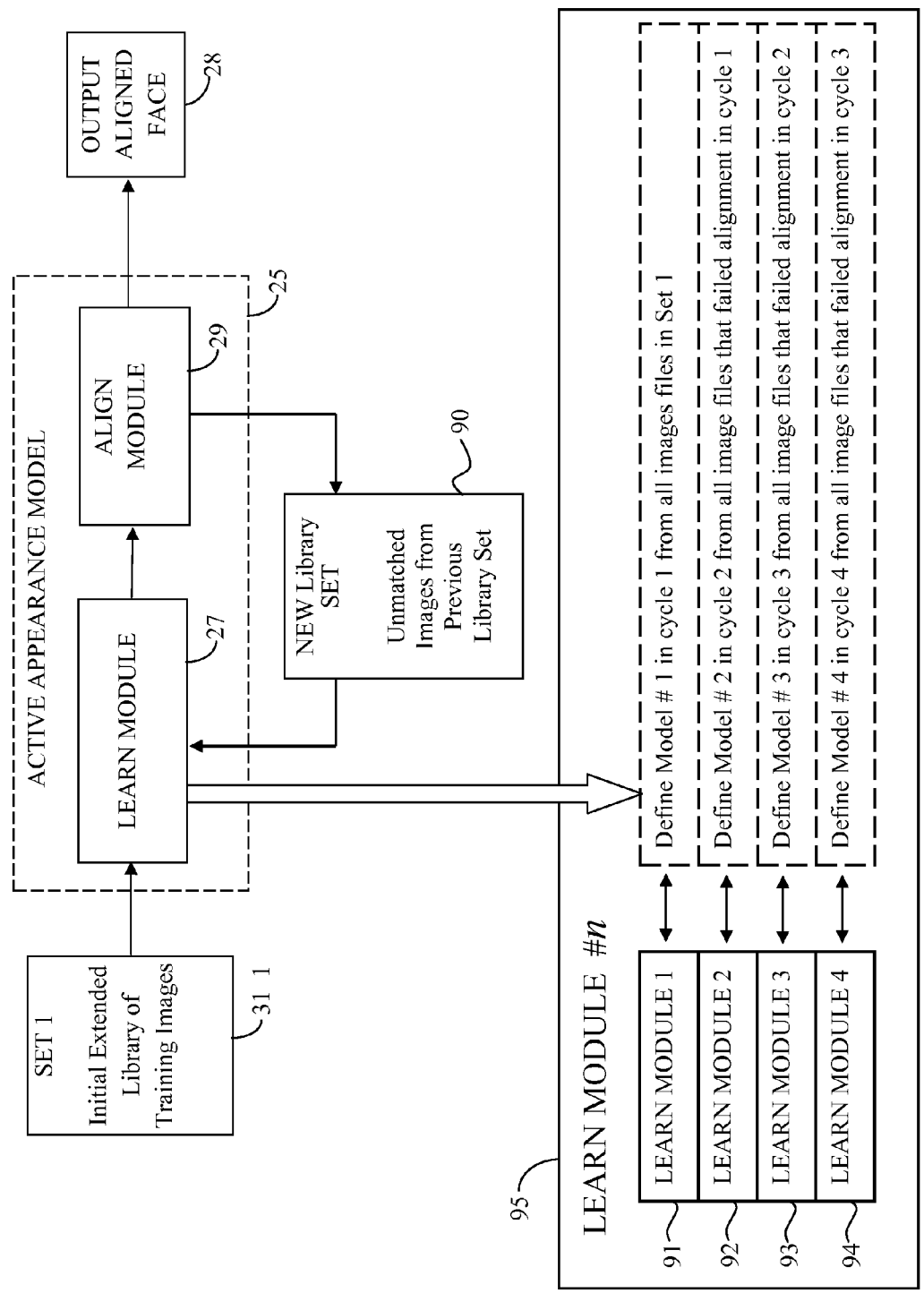
FIG. 18 illustrates a currently preferred implementation of the embodiment of FIG. 16.

A third embodiment is illustrated in FIG. 18, where all elements similar to those of FIGS. 3, 4, 16 and 17 have similar reference characters and are described above. In the present embodiment, the multiple models (i.e. Model #1 to #4) are created by cycling through application of AAM 25, with a separate model being created during each cycle. Each created model may then be accessed in sequence, and preferably in the sequence in which they were created. Since the present example illustrates the creation of four models, the structure of FIG. 18 would undergo at least four cycles, in which each of the four models are accessed individually, in sequence, and preferably in a fixed, predetermined sequence.

As before, the entire, initial extended library of training images 31_1, which is preferably comprised of thousands of samples true images, is gathered into a first set of training images, identified as SET 1. AAM 25 is given access to SET 1 for training. The first cycle follows a typical AAM process by having Learn Module 27 access SET 1 and creates a first model face and first statistical model fitting function, collectively identified as Model #1.

As it is to be understood, each of Model #1 through Model #4 can "fit" or align a different number of images from SET 1 to its respective model face using its respective statistical model fitting function. This is true not only because of the differences in each the four models, but also because each model is created from a different percentage (i.e. a progressively smaller pool) of images from extended library 31_1. Preferably, the model that can fit the greatest number of images (or largest percentage of images) of SET 1 is identified as Learn Module 1, and is the first model in the access sequence. The model that can fit the next greatest number of images (or next largest percentage of images) of SET 1 is identified as Learn Module 2 and is the next model in the access sequence, and so on to establish a fixed access sequence. Thus in the present example, Learn Module 4 would refer to the last model in the sequence and it would be the model that can fit or align the smallest number of images of SET 1, and Learn Module 3 would refer to the model that can fit the next smallest number of images of SET 1. In the present case, it is assumed that the first cycle would result in the greatest number of aligned images since the size of the library used during this cycle is greatest (i.e. includes the entire extended library of training images 31_1). For ease of explanation, it is further assumed that the model created during each proceeding cycle is appended to the end of the current access sequence since it can align a smaller number of images than the cycle that preceded it. Therefore, Learn Modules 1, 2, 3 and 4 would establish an access sequence correspond to Models #1, #2, #3, and #4, respectively.

Thus during the first cycle, Learn Module 27 accesses the entirety of the extended library 31_1 (i.e. SET 1), and creates a first model face and first statistical model fitting function, which is stored as "Model #1". Align Module 29 than uses Model #1 to attempt to align each and every image within SET 1. Any image that align module fails to align is collected into a NEW Library SET 90. After Align Module 29 has finished going all the images within SET 1, the next cycle begins.

In this next cycle, Learn Module 27 accesses all the images in NEW Library SET 90. SET 1 is no longer used. Learn Module 27 creates a second model face and second statistical model fitting function, which is stored as "Model #2". Align Module 29 than uses Model #2 to attempt to align each and every image within NEW Library SET 90. Any image that align module fails to align is identified for future use. All images that are aligned may be discarded. Thus, at the end the current second cycle, all the images that were not successfully aligned during cycle 2 are collected into a NEW Library SET 90.

It is to be understood that separate identified memory spaces 31_1 and 90 for SET 1 and the NEW Library SET 1 are shown for illustrative purposes. If desired, the same memory space 31_1 corresponding to SET 1 may be used during every cycle as long as each image within SET 1 that failed to be aligned is flagged for use during the next cycle, and any image that has already been successfully aligned during a previous cycle is discarded from use in future cycles.

During the next cycle (cycle 3 in the current example), Learn module 27 again accesses the remaining images that have not been successfully aligned during any of the previous cycles to create a third model face and third statistical model fitting function, which collectively saved as Model #3. Align Module 29 then attempts to align all previously unaligned images using Model #3. All images that Align Module 29 fails to align are marked for future use, and may be collected into NEW Library SET 90.

The process is repeated during a fourth cycle to create Model #4. During this fourth cycle, Learn Module 27 uses the remaining images that have failed to be aligned during all previous cycles to create a fourth model face and corresponding fourth statistical model fitting function. Align module 29 may then attempt to align the remaining mages in NEW Library SET 90 to determine if any additional cycles are necessary to achieved alignment of the target percentage of images of SET 1.

That is, the cycles may be repeated until a desired percentage of all images within SET 1 are successfully aligned using any of the previously defined models. For example, if after four cycles 98% of all the images within SET 1 have been aligned, but the target alignment percentage is 99%, then additional cycles my be applied until the target percentage of 99% is achieved.

It is noted that during each subsequent cycle, the pool of images used in the creation of a model face and its corresponding statistical model fitting function is defined using images having a greater number of outlier features. Thus, each subsequently created model face and corresponding statistical model fitting function is better suited for identifying specific true examples of outlier images.

The model that aligned the greatest number of images within SET 1 is designated Learn Module 1. In the present case, it is assumed that Model #1 has the greatest percentage of aligned images, and it is therefore designated Learn Module 1. Assuming that Model #2 achieves the next highest alignment number of images of SET 1, it is designated Learn Module 2. Similarly, Model #3 and Model #4, which align the next two lower numbers of images of SET 1, are designated Learn Module 1 and Learn Module 2, respectively.

This forms a modular, or variable, learn module #n 95 that in operation can select to utilize any of four Learn Modules 91-94 (corresponding to Learn Module #1, or Learn Module #2, or Learn Module #3, or Learn Module #4). For illustration purposes, #n may be thought of as variable for indicating which of Learn Modules 91-94 is being used during any given cycle.

Figure 19:
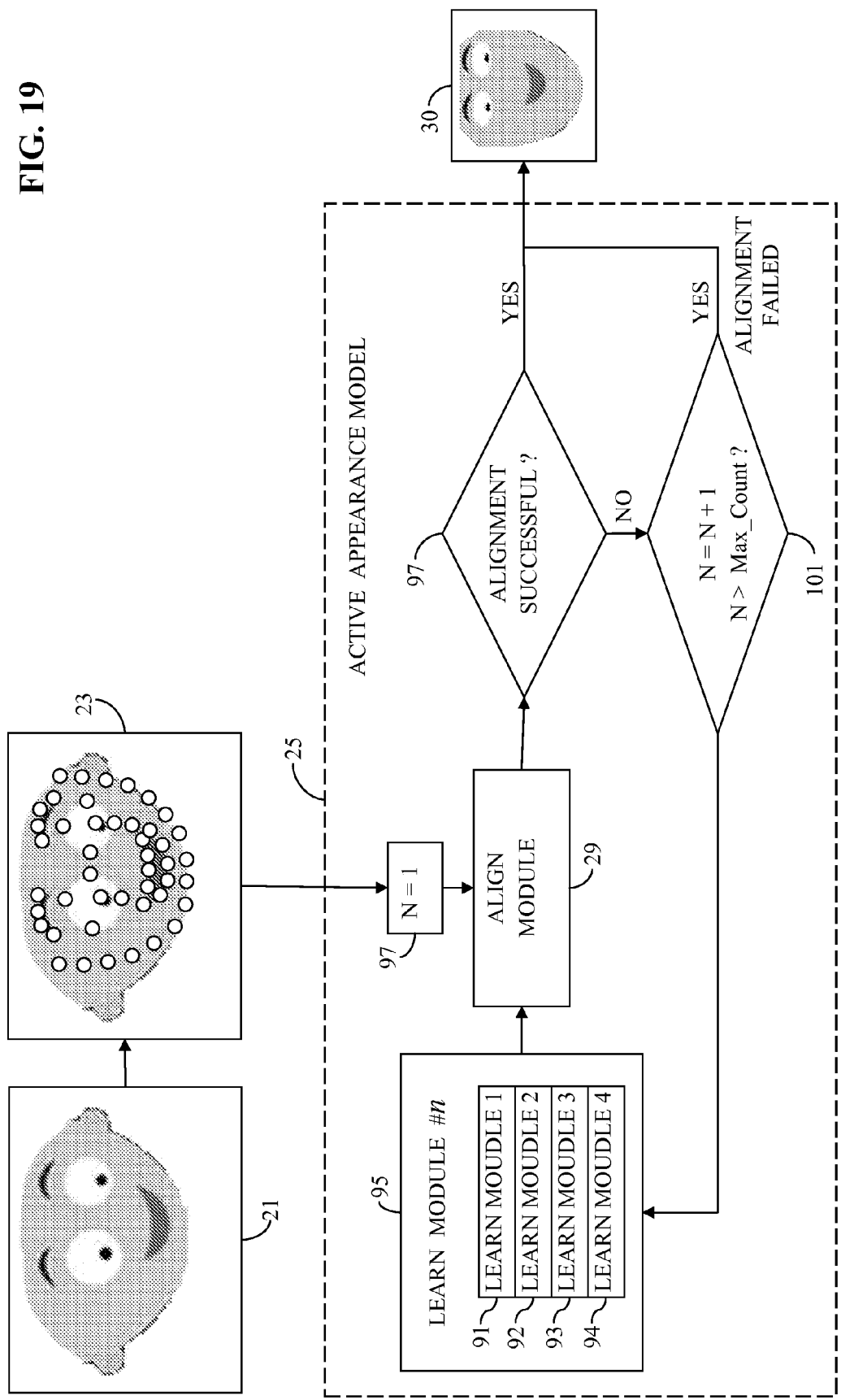
FIG. 19 illustrates a process flow in the implementation of the embodiments of FIGS. 16-18.

An example of the present AAM in operation is illustrated in FIG. 19, where all elements similar to those of FIGS. 3, 4, and 16-18 have similar reference characters and are defined above.

In operation, a new input image (or new test image) 21 that is to be submitted to AAM 25 may optionally be preprocess to determined if an object within the class of objects AAM 25 is trained to recognize (i.e. a face in the present example) is indeed present within the input image 21. This may be achieved with face detection algorithms, as is generally known in the art. This process may optionally add a few landmark points at some of the more easily identifiable characteristic facial features within the input image 21 to create a preprocessed image 23.

The present embodiment utilizes variable Learn Module #n 95, which selects one of a plurality of different Learn Modules 91-94 in operation. Ideally, AAM 25 will try multiple times to align its received image (either input image 21 or preprocessed image 23), and variable Learn Module #n 95 selects a different one of the available plural Learn Modules 91-94 during each try. In the present embodiment, it is not desirable not to repeat the use of any of Learn Modules 91-94, and so the number of available Learn Modules 91-94 determines how many times AAM 25 will attempt to align its received image, which is hereinafter assumed to be or preprocessed image 23.

A counter N (i.e. register 97) keeps track of the number of different Learn Modules 91-94 that AAM 25 has used in attempting to align preprocessed image 23. To further facilitate its use, it assumed that Learn Modules #1 to Learn Module #4 are arranged in order of effectiveness in terms of the number of images within the initial extended library 31_1 (see FIG. 18) that each was able to align. Thus, Learn Module #1 will have the greatest chance of aligning preprocessed image 23, Learn Module #2 will have the next greatest chance, and so on. Using these assumptions, counter N may further be thought of as indicating which of Learn Module #1, or Learn Module #2, or Learn Module #3, or Learn Module #4 is currently being used by AAM 25.

When AAM 25 first receives preprocessed image 23, counter N is set to N=1, indicating that variable Learn Module #n 95 selects Learn Module #1 for use. Align Module 29 thus attempts to align preprocess image 23 using the model face and statistical model fitting equation defined by Learn Module #1. If the alignment is successful (decision point 97=YES), then the aligned face 30 is output and the current alignment process ends. If alignment fails, (decision point 97=NO), then counter N is incremented by one (N=N+1), and it is then determined if counter N has a value greater than a maximum count number (decision point 101). In the present example, variable Learn Module #n 95 can select from among four different Learn Modules 91-94, and so the maximum count is preferably set to four. If counter N is greater than 4, this indicates that all of Learn Modules 91-94 have already been tried, and none were successful in aligning preprocess image 23. The alignment process would then be deemed to failed, and the process would end without producing any aligned image.

However, if counter N is not greater then the maximum count of 4, then it would indicate the Learn Module 91-94 next in line to be tried. Variable Learn Module #n, 95, then selects the Learn Module 91-94 indicated by counter N, and AAM 25 again tries to align preprocessed image 23. In the present case, N would have been incremented to a value of 2, and thus Align Module 29 would use the model face and statistical model fitting function defined by Learn Module #2 to attempt to align preprocessed image 23. Is alignment is successful, then the aligned image 30 is output and the process ends. If alignment is not successful, then the process repeats itself by incrementing counter N and selecting the next learn module in line of procession. In the present example, N could be incremented to a value of 3, and Variable Learn Module #n, 95, would select Learn Module #3 in the next attempt.

In this manner, Align Module 29 tries each of Learn Modules 91-94 in turn, each time trying to align preprocessed image 23 until an alignment is achieved, or until all Learn Modules 91-94 have been tried. This process is summarized in FIG. 20.

Figure 20:
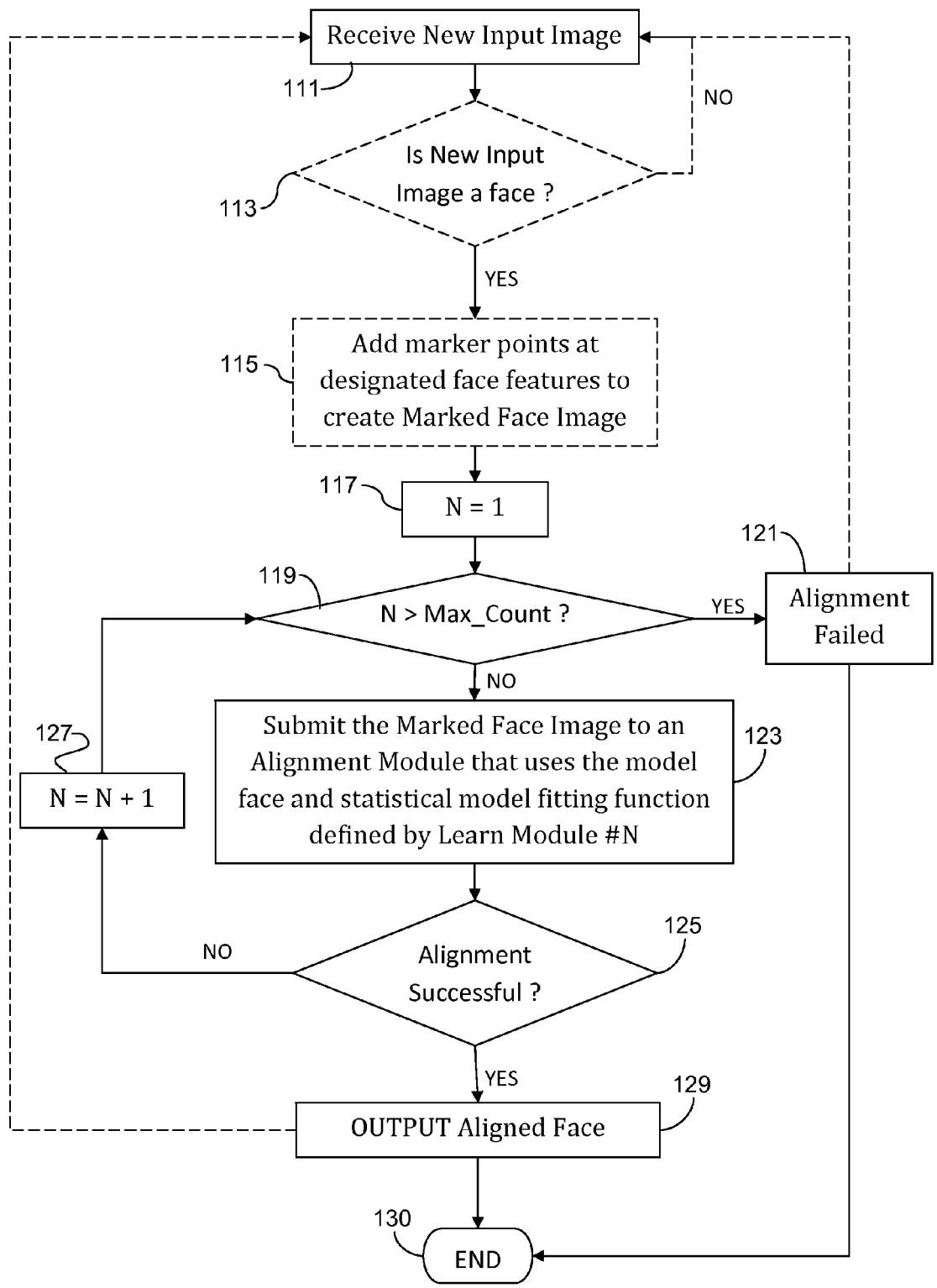
FIG. 20 is a flow chart describing a process flow of FIGS. 16-19.

With reference to FIG. 20, a first step 111 is to receive a new input image for alignment. The next two steps are optional, as is explained above. If desired, an initial examination of the new input image may be made in step 113 to determine if the received new input image depicts an object within the class of objects that that the AAM is trained to recognize. In the present example, step 113 determines if the received new input image depicts a human face. If it does not, then processing may return to step 111 to access the next input image, or may terminate. If the received new input image does depict a human face, (step 113=YES), then optional step 115 may place markers on some of the more easily identifiable characteristic features of within the received input image to create a preprocessed image.

Counter N is initialized to 1 in step 117, and step 119 determined if counter N is greater than a predefined maximum count value. As is explained above, the maximum count value is preferably equal to the number of available Learn Modules within Variable Learn Module #n 95 (i.e. equal to the number of models #1 to #4, in the above examples). Since this is the first cycle, counter N would not yet be greater than the maximum count value and the process would proceed to step 123.

In step 123 one of the available Learn Modules (preferably Learn Module number N) is selected and an alignment module would utilize the model face and statistical model fitting function defined by Learn Module N to attempt to align the preprocessed image to the model face. If alignment is successful, as determined in step 125, then the aligned face is output in step 129 and the processed may either end at step 130 or alternatively return to step 111 to access another input image for processing.

If the alignment failed, as determined by step 125, then counter N is incremented and step 119 determined if N is now greater than the predefined maximum count value. If N is greater than the predefined maximum count value, this would indicate that all the available models #1 to #3 (i.e. all the available Learn Modules that Variable Learn Module #n, 95, is capable of selecting) have been tried, and none were able to successfully align the preprocessed image. Thus, the overall alignment process would be deemed to have failed (step 121) and the process may end at step 130 or alternatively return to step 111 to access another input image for processed.

If N is not greater than the maximum count value (step 119=NO), then the next Learn Module in the line sequence of available Learn Modules would be selected, and the align module would use it to attempt the alignment anew.

This process would continue until all the available Learn Modules have been tried (i.e. until counter N is incremented to a value greater than the predefined maximum count value) or until the alignment module successfully aligns the preprocessed image.

Another novel method of handling a large, extended, training library of training images in an AAM machine that is capable of aligning a larger number of true outlier examples is to take a divide-and-conquer approach. A large training library means that the statistical model fitting function created by the learn module will be complicated and not be able to fit a large number of possible true examples (considering that a percentage of the training images will not be fitted by the statistical model fitting function). Thus, the resultant, extensive AAM would typically not be able to align a large number of outlier true examples. Additionally, because the statistical model fitting function is relatively more complicated due to it incorporating a greater number or true examples, the align module within the extensive AAM would also require more time to optimize the statistical model fitting function when attempting to align an input test image. The present invention seeks to reduce the time required to align an input test image and to successfully accommodate a larger number of outlier true examples.

The present approach replaces a single, extensive AAM with multiple smaller AAMs, at the expense of a longer setup/training phase. Basically, the extended library of training images is first divided into a plurality of smaller training sub-libraries, and a separate AAM is created for each of the smaller training sub-libraries. Preferably, the training images are grouped according to specified characteristics, and each group would constitute a separate training sub-library.

By sequential application of select AAMs, one may achieve proper alignment of an input test image. That is, when the input test image is submitted to a first small AAM, the intermediate aligned image produced by the first small AAM is applied to a second small AAM in sequence. If the resultant aligned output image from the second AAM does not achieve sufficient alignment of the input test image, then and the resultant aligned output image from the second small AAM is applied to a third small AAM in sequence, and so on.

The selection and sequence of AAMs is dependent upon the input test image, itself. Preferably, the selection and sequence of AAMs used in the alignment of the input test image is such that with each application of a selected AAM, the resultant aligned output image incrementally approaches the final aligned image.

Figure 21:
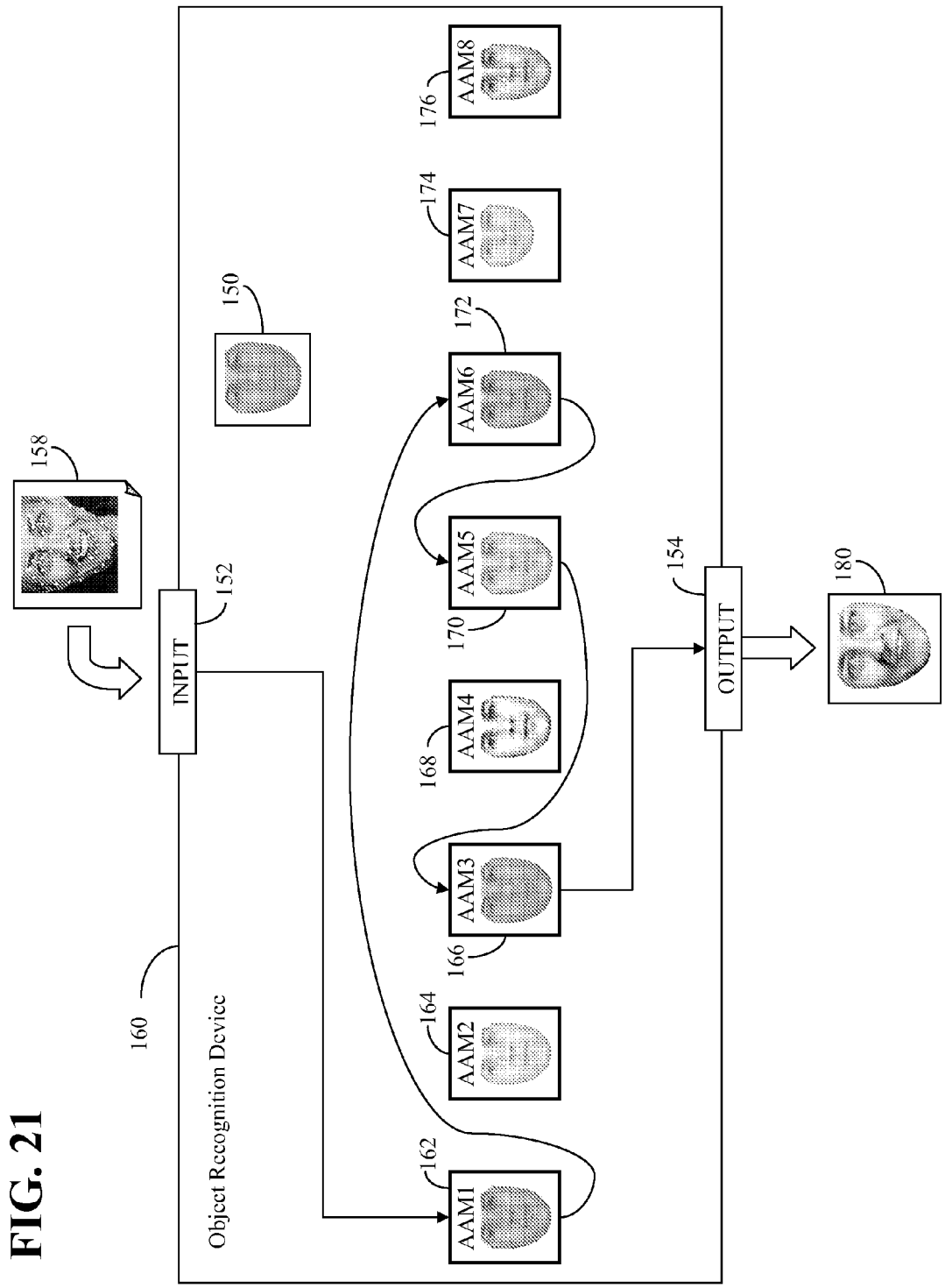
FIG. 21 illustrates an active appearance model structure (or method) for creating (training) a machine capable of fitting a high percentage of the images within a training library of training images by means of selective, sequential application of a plurality of smaller AAMs.

With reference to FIG. 21, one implementation of an object recognition device 160 in accord with the present invention for recognizing a class of object (a human face in the present example) portrayed in an input test image 158, would include an input 152 for receiving input test image 158 and an output 154 for outputting an optimized alignment image 180, assuming that a human face has been successfully identified within input test image 158 and fitted to a model image, as is explained above in the description of the operation phase of an AAM. That is, object recognition device 160 outputs optimized alignment image 180 as a successful recognition of the class of object it is trained to identify (i.e. a human face).

Within the training phase of the present embodiment, a large, extensive library of training images (not shown) would have been divided into groups of training images. As is explained above, each training image in the extensive library training images (i.e. the combination of all the images in all the groups of training images) would have a true example of a human face, and a predefined set of characteristic features of a human face would be identified and labeled within each training image. Preferably, the training images within the extensive library of training images are grouped according to some shared trait(s) in select characteristic feature(s) so that the images within each group possess a resemblance to each other defined by the specific trait(s). For example, the training images within a group may have a similar face shape, nose shape, mouth shape, texture tone(s) in specific areas, gaze direction, shadowing, obscured regions, etc., or any combination of features traits. In this manner, each group of training images is distinct from another according to each group's defining characteristic traits. That is, each group of training images is distinguished by a list of shared traits in select characteristic feature(s).

If the sorting of training images into groups is implemented manually, then these traits may be subjective, as determined by the individual(s) doing the sorting. This sorting, however, may alternatively be automated according to predefined criteria.

In the present example, object recognition device 160 is shown to include eight active appearance model processing blocks (i.e. eight AAMs): 162, 164, 166, 168, 170, 172, 174, and 176. It is to be understood, however, that any number of AAMs is envisioned within the scope of the present invention. Each AAM processing block would include its own corresponding learn module (not shown) and corresponding align module (not shown). As is explained above, within each AAM processing block, its corresponding learn module creates a corresponding model image and statistical model fitting function from its corresponding group of training images (i.e. its corresponding sub-library of training images). As is also explained above, within each AAM processing block, its corresponding align module attempts to align its corresponding model image to an input image by optimizing its corresponding statistical model fitting function through multiple iterations.

Since the training images within each group share a distinguishing trait in some characteristic feature(s), the resultant model image and statistical model fitting function of each AAM processing block reflects the specific traits of the group of training images from which it is trained. Thus, the model image of each AAM processing block would be different, and the different model images would be distinguished from each other by their reflected (i.e. highlighted or emphasized) characteristic traits.

Each AAM processing block is thus trained to identify its specialized characteristic traits. Basically, since true outlier examples of a specific class of object (i.e. human face) are characterized by shape/texture deviations from a norm, and since training images having such deviations within the extensive library of training may be grouped together to form their own group (i.e. their own training sub-library), the resultant AAM processing block created from such a group would effectively be trained to identify such deviations in true examples of the object sought. Furthermore, since the groups contain a smaller number of training images than the overall extensive library, each resultant AAM processing block has a comparatively simplified model image and statistical model fitting function resulting in faster execution of its corresponding align module. Therefore, not only is the present invention able to recognize a larger range of true outlier cases of a specific class of object, it may achieve faster performance, as well.

In the present example, the extensive training library would have been divided into eight groups of training images (not shown), and each of the eight AAM processing blocks 162, 164, 166, 168, 170, 172, 174, and 178 is trained using a corresponding one of the respective eight groups of training images. Consequently, each AAM has a distinct model image and statistical model fitting function.

If desired, an overall model image 150 may be constructed using all the images in the original extensive library. That is, overall model image 150 is constructed using the combination of all the images in all the groups of images used to train all the AAMs processing blocks.

In operation, it may be necessary to utilize more than one of the available AAM processing blocks to achieve sufficient alignment of an input test image. In the illustrated example of FIG. 21, input test image 158 is submitted to a first AAM processing block selected for having a model image that most closely resembles (i.e. matches) input test image 158 (or for having a statistical model fitting function whose reflected specific traits most closely match the same traits on input test image 158). This can be determined by comparing the input test image to the model image of each of the AAM processing blocks 162-176 to identify the AAM whose corresponding model image most closely resembles input test image 158. A measure of resemblance (matching) may be obtained by using a measure of misalignment (for example, as is explained above in reference to FIG. 10).

In the present example, it is assumed that AAM 162 is selected from among all of AAMs 162-176, for having a model image that most closely matches input test image 158. AAM 164 would output an intermediate aligned image (not shown). A determination is then made to resolve whether this intermediate aligned image achieves sufficient alignment.

This determination may be made by obtaining a misalignment measure of this intermediate aligned image and the model image of AAM 162 (or alternatively a misalignment measure of this intermediate aligned image and overall model image 150). If this misalignment measure is not greater than a predefined maximum measure, then the alignment is deemed sufficient and processing ends by outputting the intermediate alignment image via output 154. Processing may also end if a predefined number of AAMs have been accessed, in sequence, in the attempt to align input test image 158, or if the alignment measure obtained from a current AAM is not better than an alignment measure achieve from a most-previously accessed AAM. That is, processing may end if an additional application of another AAM does not achieve an improvement in alignment over that achieved by the most-previous accessed AAM.

Assuming that none of the conditions for terminating processing have been met, and that the alignment measure obtained from the intermediate aligned image output by AAM 162 is greater than the predefined maximum measure, then this intermediate aligned image is submitted to another AAM. Preferably, it is submitted to the AAM whose model image most closely resembles (i.e. matches) it, as explained above. In the present example, it is assumed that the intermediate aligned image output from AAM 162 is submitted to AAM 172.

The above process then repeats. Again, assuming that none of the conditions for terminating processing have been met, and that the alignment measure obtained from the intermediate aligned image output by AAM 172 is greater than the predefined maximum measure, then the intermediate aligned image output from AAM 172 is submitted to another AAM. In the present example is assumed that the intermediate aligned image output from AAM 172 most closely matches the model image of AAM 170, and it is therefore submitted to AAM 170 for further processing.

Again, assuming that none of the conditions for terminating processing have been met, and that the alignment measure obtained from the intermediate aligned image output from AAM 170 is greater than the predefined maximum measure, then the intermediate aligned image from AAM 170 is submitted to another AAM. In the present example, it is assumed that the intermediate aligned image output from AAM 170 most closely matches the model image of AAM 166, and thus it is submitted to AAM 166 for further processing.

The present example assumes that the intermediate aligned image 180 output from AAM 166 has achieved sufficient alignment (i.e. its alignment measure is not greater than the predefined maximum measure), and thus sends the intermediate aligned image produced by AAM 162 to output 154, and processing ends.

Figure 22:
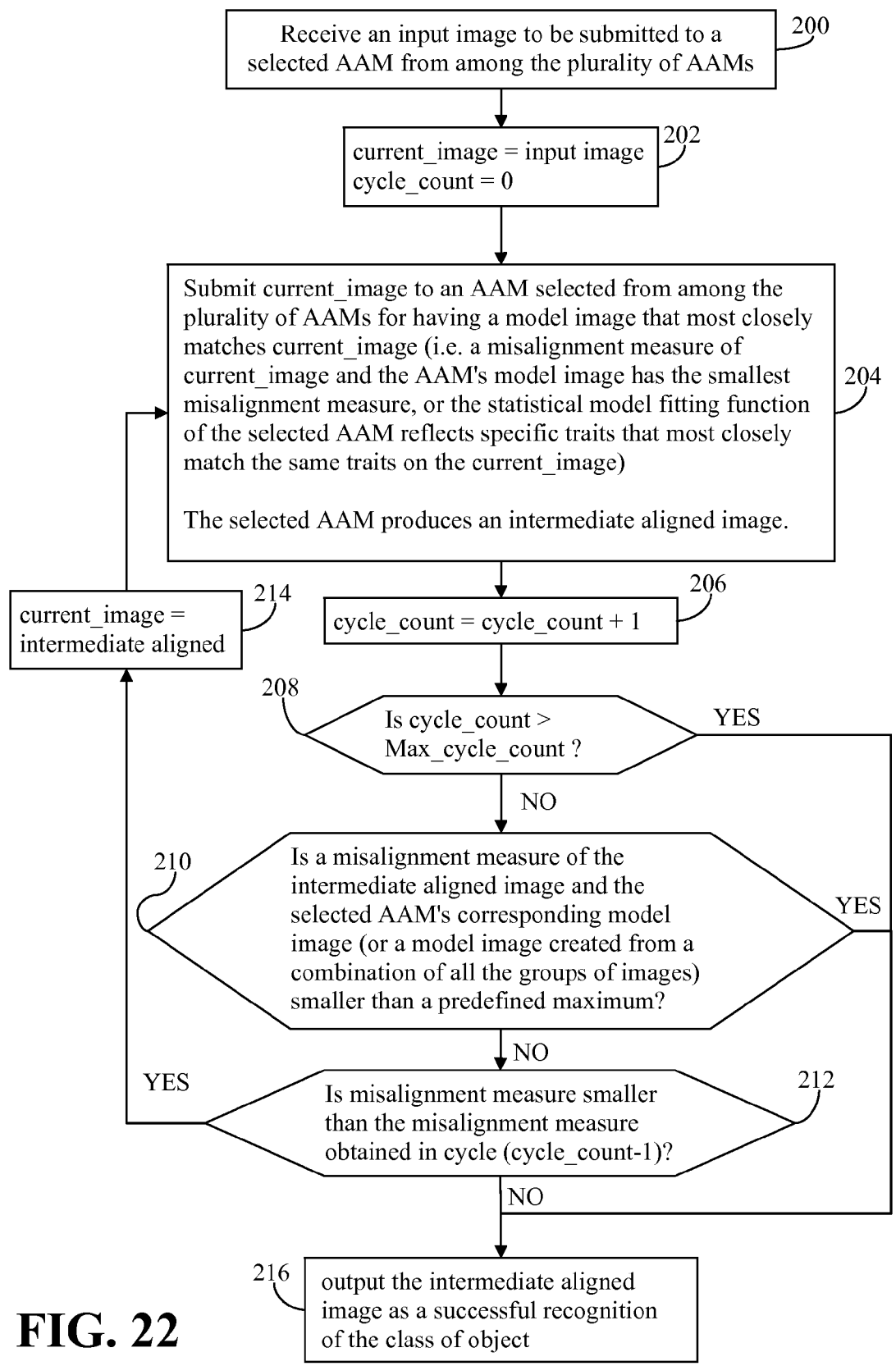
FIG. 22 is flow chart describing a general process flow of the structure of FIG. 21.

It is to be understood that the AAM selection sequence may be controlled by a data processing module, or data control module, not shown in FIG. 21. A general data flow implementable by such a data processing module for controlling AAM selection sequence is illustrated in FIG. 22. First, an input image to be submitted to a selected AAM is received (step 200). If desired, two variables may be set (step 202). A first variable current_image indicates which image is currently being processed. Thus, the current_image is initially set to the input image. Variable cycle_count may be used to keep track of how many times one has cycled through step 204. Since step 204 has not been reached yet, cycle_count is initially set to zero.

In step 204, an AAM is selected based on which of the many AAMs' corresponding model image most closely matches the current_image. As explained above, this may be determined by comparing a misalignment measure of the current_image and each AAM's corresponding model image. Alternatively, this determination may be made by identifying the AAM whose corresponding statistical model fitting function is best suited to identify specific traits that most closely match similar traits on the current_image. The current_image is then submitted to the selected AAM, which produces an intermediate aligned image.

Variable cycle_count may be incremented (step 206) upon finishing processing of step 204. Step 208 checks if the cycle_count has reached a predefined maximum. Basically, this places an upper limits on how many times one may continue to resubmit an intermediate aligned image to another AAM. If the maximum count has been reached (step 206=YES), then the current intermediate aligned image may be output as a successful recognition of the class of object, i.e. human face, (step 216). If the maximum count has not yet been reached (step 208=NO), then processing continues to step 210.

In step 210, the data processing module determines if a misalignment measure of the intermediate aligned image and the selected AAM's corresponding model image (or a model image created from a combination of all the groups of images) is smaller than a predefined maximum. If it is (step 210=YES), then processing ends and the intermediate image may be output as the successful recognition of the class of object (step 216). If has not (step 210=NO), then further processing may be necessary.

Step 212 first determines if any improvement has been achieved in the current cycle as compared with the most-previous cycle. If step 212=NO, indicating that no improvement (or an improvement smaller than a predefined minimum) has been realized in the current iteration, then processing ends and the current intermediate aligned image may be output as the successful recognition of the class of object (step 216).

However, if an improvement has been achieved (step 212=YES), then variable current_image is set to the current intermediate aligned image (step 214), and processing returns to step 204 for another cycle.

The approach of FIGS. 21 and 22 may require that at each iteration, the current_image be compared with the model image of every AAM to determine to which AAM the current_image should submitted. If there is a large number of AAMs, this selection process may be too time consuming. An alternative approach, illustrated in FIG. 23, uses a hierarchical tree approach to reduce the number of model images to which the current_image should be compared to select a next AAM in a sequence (i.e. reduce the number of AAMs that need to be checked).

Figure 23:
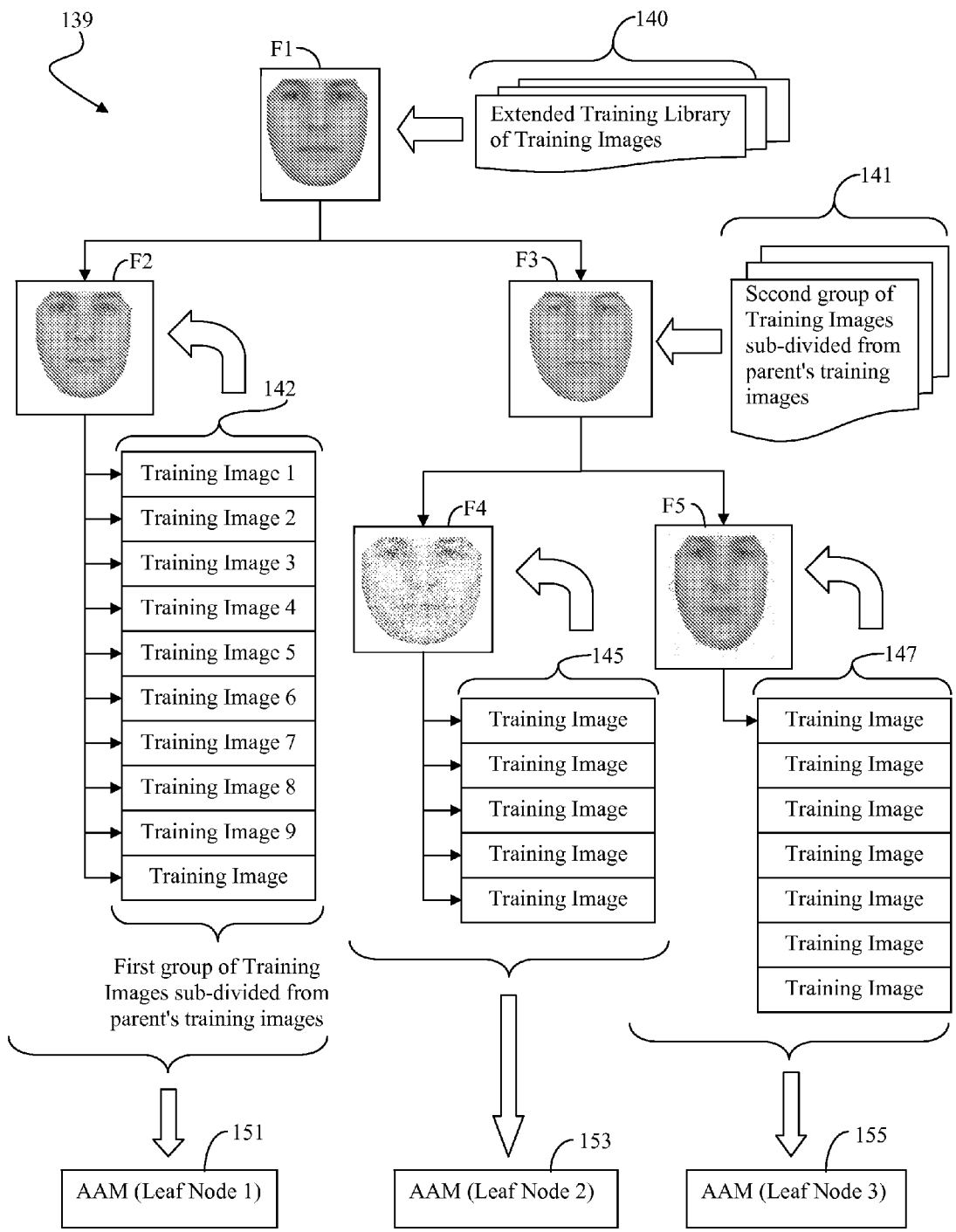
FIG. 23 is a more detailed implementation of the general structure of FIG. 21.

With reference to FIG. 23, in a currently preferred approach, a large, extend training library of training images 140 is preferably divided into a hierarchical tree structure 139. This process may be accomplished manually, or may be automated. Preferably, the hierarchical tree 139 defines link paths between nodes according to similarities in specific (predefined) characteristic features of the class of object illustrated in the training images. In the present example, it is assumed that the class of object is a human face, and that specific characteristic features of a human face have been manually identified and mapped within each training image. For illustration purposes, a root model image F1 constructed from the entirety of extended library 140 is shown, but the creation of root model image F1 may be optional, as is explained above.

In the construction of hierarchical tree 139, extended training library 140 is first divided into at least two groups of training images, 141 and 142, according to similarities (or dissimilarities) in specific characteristic feature(s). For examples, the images may be divided according to characteristic features such as face shape, nose shape, mouth shape, texture tone(s) in specific areas, gaze direction, shadowing, obscured regions, etc., or according to any combination of such features. Preferably, all groups of training images that constitute a leaf node (i.e. a bottom-most node in hierarchical tree 139) should not have more than a predefined maximum number of training images. If a group of images is found to have less than the predefined maximum number of training images, then it may be designated a leaf node and remain fixed. Other criteria for determining when a group of images should be further divided (even if the number of images is already smaller than the predefined maximum number of training images) is a variance measure or a max distance from a norm, such as root model image F1. However, if a group is found to have more than the predefined maximum number of training images, then it is designated a parent node subject to further division.

Thus, after extended library 140 is divided into groups 141 and 142, the number of training images in each of groups 141 and 142 is then checked to determine if either group has fewer training images than the maximum number permissible. If it does, then it designated a leaf node. If it has more than the maximum permissible number, then it is designated a parent node and additional child nodes are constructed below it.

In an hierarchical tree structure, as it is known in the art, the root node is the top-most node in the hierarchical tree, a parent node is a node that has at least one other node below it and linked to it, a child node is a node linked to a parent node above it, and a leaf node is a node with no child nodes below it. A leaf node is effectively a bottom-most node along a link path (or branch path) downward from the root node. If a created group of training images has more than the permissible maximum number of training images, then it will be defined as a new parent node and its training images will be further divided into two new smaller groups that will constitute two child nodes below (and linked to) this new parent node. This dividing process continues until one has only groups having not more than the permissible maximum number of training images.

For ease of illustration, in the example of FIG. 23, it is assumed that the maximum number of training images permissible within each final group of training images (i.e. each leaf node) is 10 training images, and it is further assumed that the initial extended training library 140 has 22 total training images. It is to be understood, however, that these numbers is purely for illustration purposes and that in practice, extended training library 140 may in have hundreds or thousands of training images. In a currently preferred practical application of the present invention, extended training library 140 would have 1000 independent images, (i.e., not sequential images obtained from a video sequence).

In the present example, the first constructed group 141 has 12 training images and the second constructed group 142 has 10 training images. Since the second group 142 has 10 training images (i.e. does not have more than the maximum permissible number of training images), it is designated a leaf node and will not be divided any further.

A new AAM 151 is defined using only the images in the second group 142. As before, this is accomplished by means of a learn module (not shown) that constructs a model face F2 and a statistical model fitting function using the characteristic features all 10 training images in second group 142. For ease of explanation, model face F2 will be used interchangeably with the leaf node defined by second group 142. Thus, F2 defines Leaf Node 1. An align module (not shown) within AAM 151 would than make use of this statistical model fitting function to align a received input image, as is explained above.

On the other hand, first group 141 has more than the maximum permissible number of training images (i.e. more than 10 training images). Therefore, it is designated to become a parent node and its 12 images are further divided into two new groups, 145 and 147, according to the same, or according to other, characteristic feature(s) as those used to divide its parent node, F1.

Like before, the 12 images in first group 141 are separated according to similarity, such that the training images in each new group 145 and 147 share some similar characteristic feature(s). First, a new model face F3 is created combining the characteristic feature of all 12 training images within first group 141. Again, for ease of explanation F3 is used herein to refer to the parent node defined by first group 141. Thus, new model face F3 is a new parent node, and it is also a child node below root node F1.

In the present example, the 12 training images within first group 141 are divided into new groups 145 and 147. Group 145 has 5 training images and group 147 has 7 training images. Since both groups 145 and 147 have less than the maximum permissible 10 training images, both become leaf nodes with no further child nodes below either of them. Because both groups 145 and 147 define leaf nodes, a separate, corresponding AAM is constructed for each of groups 145 and 147, resulting in AAM 153 and AAM 155, respectively.

Second AAM 153 is constructed using only the training images within group 145, and third AAM 155 is constructed using the training images only within group 147. As before, construction of AAM 153 entails a learn module (not shown) defining a new model image F4 and new statistical model fitting function using the characteristic features of only the training images in group 145, along with construction of a corresponding align module (not shown). Similarly, construction of AAM 155 entails construction of a new learn module (not shown) defining another new model image F5 and another new statistical model fitting function using the characteristic features of only the training images in group 147, along with construction of another corresponding align module (not shown).

Thus, by the end of construction of hierarchical tree 139, the initial extended training library 140 will have been divided into multiple smaller groups (or sub-libraries) 142, 145 and 147, and a separate AAM (151, 153 and 155, respectively) would have been constructed for each of sub-libraries 142, 145 and 147. Additionally, each child node will be defined by a model face (F2 through F5) constructed from a different subset (i.e. group) of the training images carved from the original extended training library 140. As is explained above, a model image F1 for the root node may optionally be constructed from the entirety extended training library 140.

Once hierarchical tree 139 and all three the AAMs 151, 153, and 155 (each having a one-to-one relationship with a corresponding leaf node, F2, F4 and F5, respectively) are complete, hierarchical tree 139 may be used to align an input image, as follows.

Figure 24:
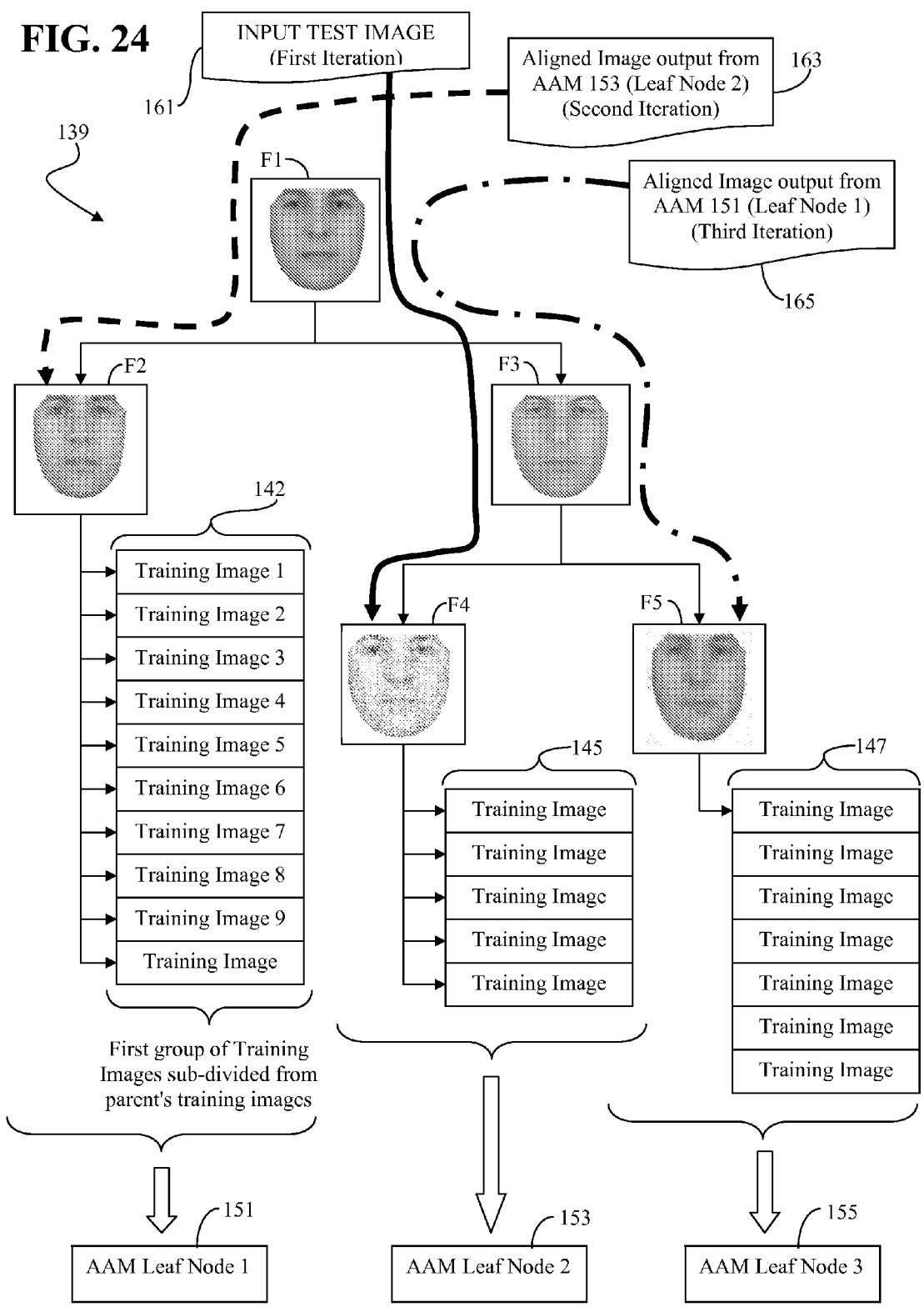
FIG. 24 illustrates a process flow of the structure of FIG. 23 in operation.

FIG. 24 illustrates implementation of hierarchical tree 139 to align an input test image 161. In FIG. 24, all elements similar to FIG. 23 have similar reference characters and are described above. First, input test image 161 is compared with the two model images below root node F1. That is, input test image 161 is compared with F2 and with F3 to ascertain a measure of similarity with model images F2 and F3, and thereby determine if input test image 161 more closely matches model image F2 or F3. This may be accomplished, for example, by means of the misalignment determination technique described above with reference to FIG. 10, or by any other method known in the art.

In the present example, it is assumed that input test image 161 is more similar to F3, and thus the path down hierarchical tree 161 proceeds to node F3. Since F3 is not a leaf node, the image currently being process (i.e. input test image 161) is compared with F3's two child nodes, F4 and F5. That is, input test image 161 is compared with model images F4 and F5 to determine which of the two model images, input test image 161 more closely resembles. Presently, it is assume that input test image 161 more closely matches model image F4, and progress down hierarchical tree 139 to node F4.

Since node F4 is a leaf node (i.e., it has no child node below it), input test image 161 is submitted to AAM 153 (i.e. the AAM associated with node F4). AAM 153 attempts to align input test image 161, as described above, and outputs a first aligned image 163. It is now determined if first aligned image 163 output by AAM 153 provides sufficient alignment of input test image 161, or if further processing is required. This determination may be made by verifying if AAM 153 deemed its alignment successful, or by checking the similarity (i.e. misalignment) of first aligned image 163 with F4 (or alternatively with F1). If sufficient alignment has been achieved, then processing ends and first aligned image 163 is output as the overall aligned image. If the alignment is deemed not to be sufficient (i.e. a measure of the alignment is not within predefined specifications), then first aligned image 163 is resubmitted to hierarchical tree 139 for a second interrelation.

In this second iteration, first aligned image 163 is compared with F2 and F3 to determine which of the two model images it more closely matches (i.e. resembles). In the present example, it is assumed that first aligned image 163 has a closer alignment with F2 than with F3, and thus progress down hierarchy tree 139 proceeds to node F2. Because node F2 is a leaf node, first align image 163 is submitted to AAM 151 for alignment. AAM 152 outputs a second aligned image 165, which is then checked to determine if sufficient alignment has been achieved or if further processing is required. Like before, this determination may be made by checking whether AAM 152 deemed second aligned image 165 valid, or may be determined by obtaining a measure of the similarity (or misalignment, i.e. mismatch) of second aligned image 165 with model image F2 (or with model image F1). If sufficient alignment has been achieved (or if the measure of alignment has not improved from the most-previous iteration, or if a predefined number of iterations have been executed), then processing ends. If the alignment is deemed not be sufficient (i.e. a measure of the alignment is not within predefined specifications), then second aligned image 165 is resubmitted to hierarchical tree 139 for a third interrelation.

Like before, this third iteration begins at the top of hierarchical tree 139 by comparing the misalignment of second aligned image 165 with model image F2 and with model image F3. In the present example, it is assumed that second aligned image 153 more closely matches model image F3, and progress down hierarchical tree 139 proceeds to node F3. Since node F3 is not a leaf node, second aligned image 165 is then compared to F3's child nodes, F4 and F5. That is, second aligned image 136 is compared with model image F4 and with model image F5 to determine which of these two model images it most closely matches (i.e., is more aligned). In the present example it is assumed that second aligned image 165 more closely aligns with model image F5, and thus progress down hierarchical tree 139 proceeds to node F5.

At node F5, second aligned image 165 is submitted to AAM 155, which is the AAM associated with node F5. Like before, AAM 155 attempts to align second aligned image 165 with its model image, F5, and if it succeeds in aligning second align image 165, AAM 155 will output a third aligned image (not shown). Like before, a determination may be made to determine if sufficient alignment has been achieved. Also like before, this determination may be made based on whether AAM 155 deems its output third align image a successful alignment, or by a measure of the misalignment between the third align image and model image F5 (or model image F1). If sufficient alignment has been achieved (or if the measure of alignment has not improved from the most-previous iteration, or if a predefined maximum number of iterations have been executed), then processing ends. Otherwise, the third aligned image may be resubmitted to hierarchical tree 139 for a fourth interrelation, and so on.

Although in the present example three iterations were described, which effectively made use of information from all 22 of the original training images of extended library 140, this is purely for illustration purposes. In a more practical application, extended library 140 may have thousands of independent true sample images, and the maximum number of images limited to each leaf node may be a 100 images. In practice, it has been found that five to ten iterations is typically sufficient to properly align an input test image, including test images of true outlier examples. Since each (comparatively) small AAM in each leaf node is much less complicated than a single extensive AAM constructed from the entirety of all the training library in extended training library 140, processing time is decreased and accuracy in aligning a larger number of true outlier images is increased.

Figure 25:
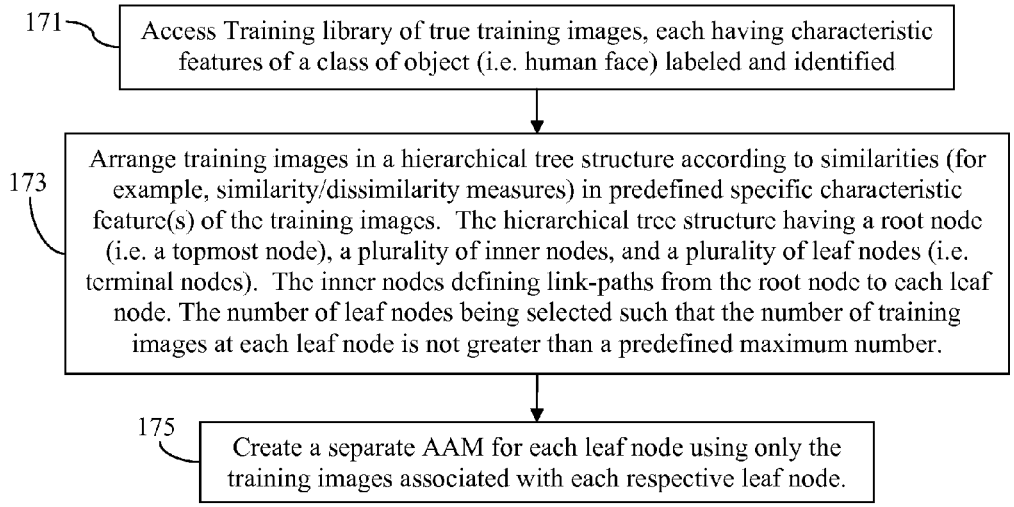
FIG. 25 illustrates a flowchart illustrating a general process of training of the structure of FIG. 23.

An overview of the process for training a hierarchical AAM, such as illustrated in FIGS. 23 and 24, is shown in FIG. 25. A first step 171 is to access a training library of true training images, each having characteristic features of a class of object (i.e. human face) labeled and identified. Preferably, this training library is an extended training library having a large number of training images. Next, the hierarchy tree is constructed in step 173. Basically, the training images in the extended training library are arranged into a hierarchical tree structure according to the similarity (for example, according to one or more similarity or dissimilarity measure) of predefined specific characteristic feature(s) of the training images. The hierarchical tree structure is constructed to have a root node (i.e. topmost node), a plurality of inner nodes (i.e. nodes with at least a parent node above them and a child node below them), and a plurality of leaf nodes (i.e. terminal nodes or bottom-most nodes with no child nodes below them). The inner nodes define link-paths from the root node to each of the leaf nodes. At each non-leaf node, the training images are divided into at least two groups if images according to some similarities in characteristic feature(s), and each of the at least two groups defines a child node. The number of leaf nodes is selected such that the number of sample images at each leaf node is not greater than a predefined maximum number. Finally in step 175, a separate AAM is created for each leaf node using only the training images associated with each respective leaf node.

Figure 26:
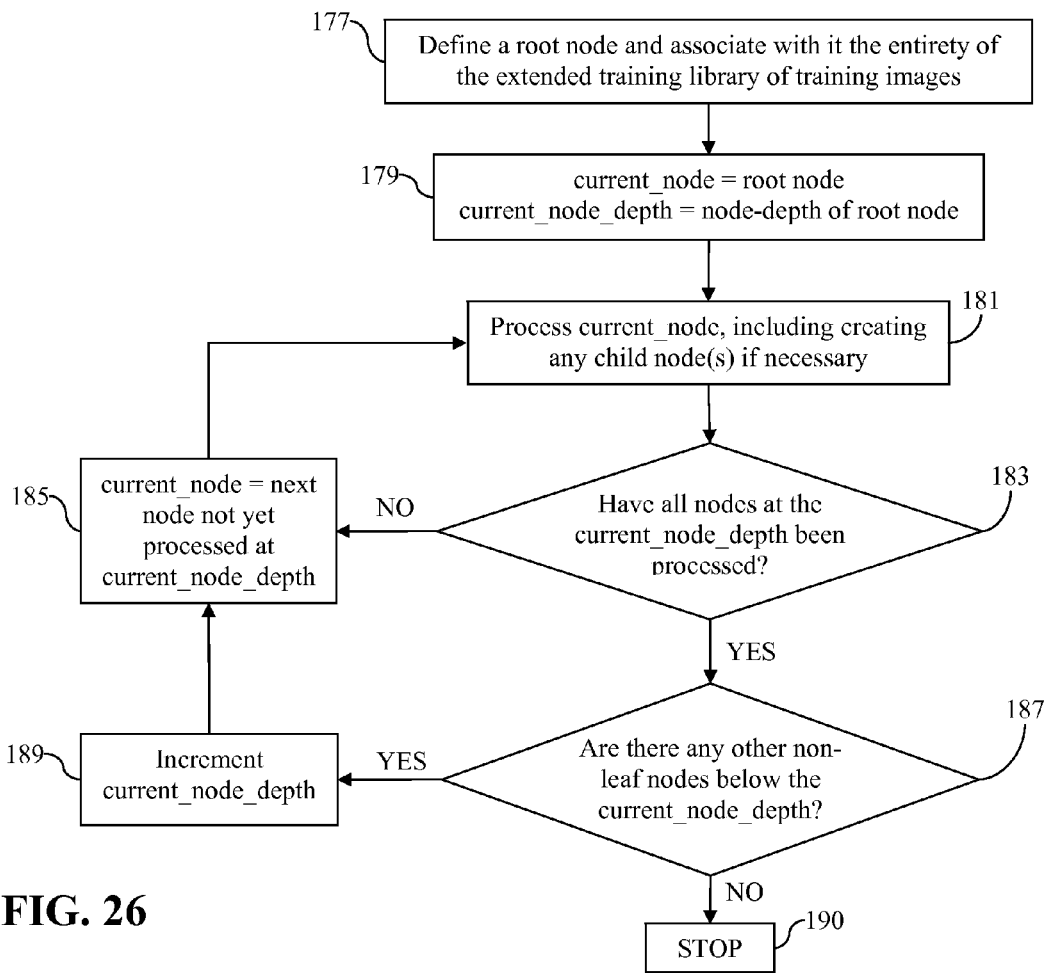
FIG. 26 illustrates a more detailed description of step 173 of the flowchart of FIG. 25.

Although a description of a preferred construction of a hierarchical tree is provided above with reference to FIG. 23, an alternate description for implementing step 173 (i.e. constructing a hierarchical tree) is shown in FIG. 26.

With reference to FIG. 26, in an initial step 177, a root node is defined and the entirety of the extended training library of training images is associated with it. A couple of variables may be initiated in step 179. A first variable, "current_node", points to the current node being worked with, and it is initially set to the root node since it is the only node currently constructed. As is explained above in reference to FIG. 23, the hierarchical tree may have multiple levels of inner nodes in a path from the top-most node (i.e. the root node) down to each bottom-most node (i.e. each leaf node). In a hierarchical tree, the term "depth" may be used to describe a specific level traversed downward from the root node. Therefore a second variable, "current_node_depth", may be used to identify the depth level down from the root node in which the current_node lies. Since the root node is the only node yet constructed, variable current_node_depth is initially set to the node-depth of the root node.

In step 181, the current_node is processed, which means that if the number of training images associated with the current node are too many for it to be classified as a leaf node, then the training images associated with the current_node are divided into two groups according to similarities in specific characteristic feature(s). The processing further includes determining if the number of training images in either of the two newly created groups is greater than the predefined maximum number. If the number of training images in a group is not greater than the maximum number, then that group is designated a leaf node under the current_node. If the number of images in a group is greater than the maximum number, then that group is designated a non-leaf, child node of the current_node.

After processing the current_node, one may move laterally to process another node at the same depth as the current_node. In this manner, all the nodes at a common level are processed before proceeding downward to a next level in the hierarchical tree. To do this, step 183 first determines if there are any other nodes at the current depth level that have not yet been processed according to step 181. If not all nodes at the current depth level have been processed (step 183=NO), then step 185 reassigns current_node to the next node at the current level that has not yet been processed, and returns to step 181 to process that next node. In this manner, steps

181-185 cycles until all the nodes at a current depth level have been applied to the processing of step 181.

When all the nodes at a current depth level have been processed (step 183=Yes), then step 187 checks if there are any non-leaf, child nodes at the next depth level below the current_node. If there are (step 187=Yes), then one proceeds to the next lower, depth level of the hierarchical tree in step 189 by incrementing current_node_depth to the next lower depth level. Processing then proceeds to step 185 where current_node is assigned to a node not yet processed within the current_node_depth.

However, if there are no non-leaf nodes below the current_node (step 187=NO), then the hierarchical tree is complete and the process ends (step 190).

Figure 27:
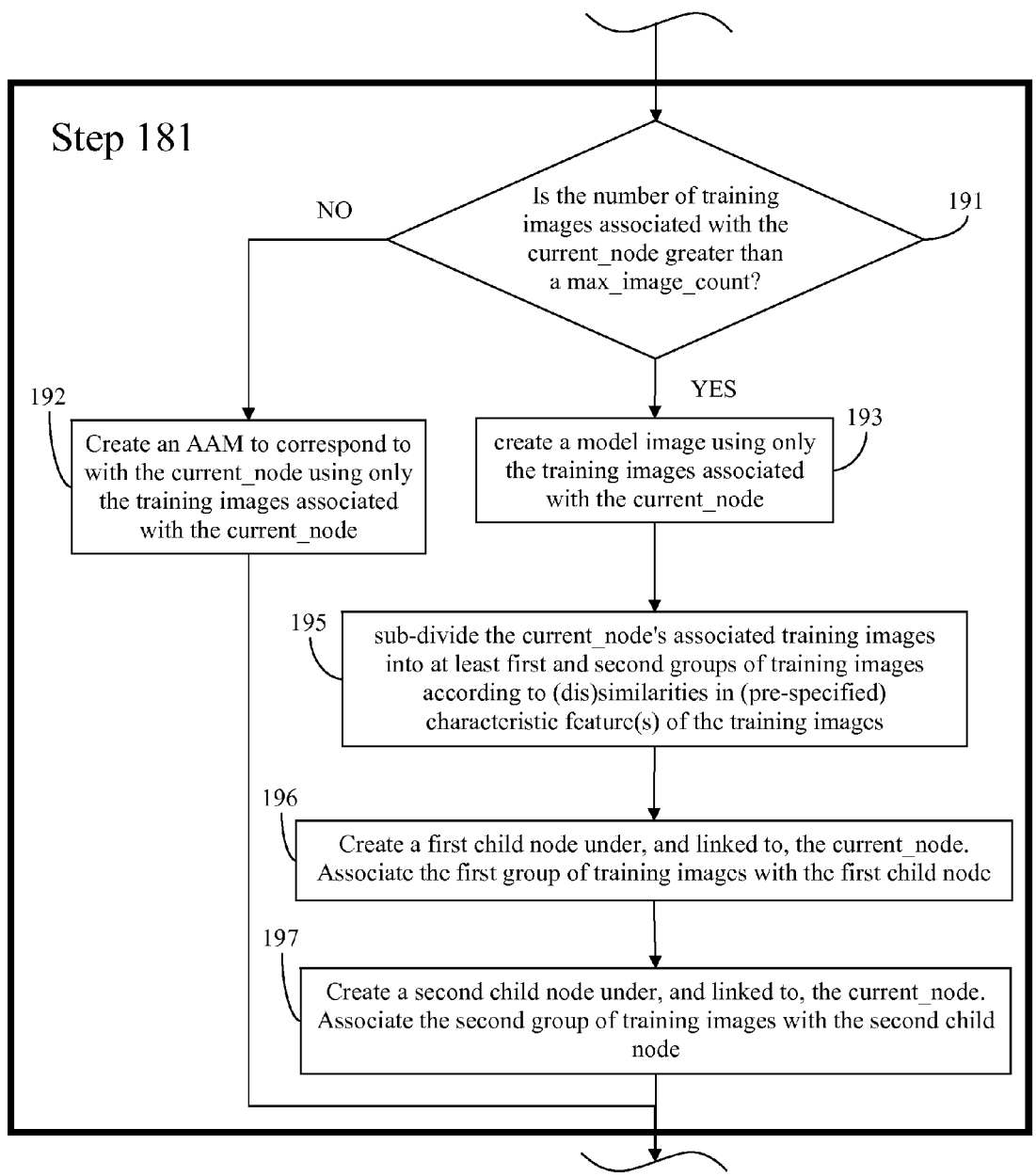
FIG. 27 is a more detailed description of step 181 of the flowchart of FIG. 26.

An example of an implementation of the processing used in step 181 is described above in reference to FIG. 23, but another description is provided in FIG. 27. Initial step 191 first determines if the number of training images associated with the current_node is greater than the maximum number of permissible images (i.e., greater than max_image_count). If it is not (step 191=NO), then the current_node is a leaf-node and an AAM is constructed using the training images associated with that leaf node in step 192. Alternatively, if step 191=NO, one may still check if a variance measure of a model image created with training images associated with the current_node or if a maximum distance of this created model image is greater than a maximum distance from mean model image to determine if it should be further split into multiple nodes. However, assuming that these alternate criteria are not being used, then processing of step 181 ends and processing could proceed to step 183 of FIG. 26.

Alternatively, if step 191=YES, meaning that the number of sample images associated with the current_node is greater than max_image_count, then a new model image is created using the training images associated with the current_node (step 193). Additionally, the current_node's associated sample images are sub-divided into at least first and second groups of sample images according to similarities (or dissimilarities) in characteristic feature(s) of the training images (step 195), which may be pre-specified if desired.

If only first and second groups of sample images are created, then a first child node under, and linked to, the current_node is created, and the first group of sample images is associated with this first child node (step 196). Similarly, a second child node is created under, and linked to, the current_node, and the second group of sample images is associated with the second child node (step 197).

Alternatively if more than first and second groups of sample images are created, then a separate child node is created per created group of sample images. Each created child node is created under, and linked to, the current_node, and the group of sample images from which it was created is associated with the created child node.

This ends the processing of step 181 and progress may then continue to step 183 of FIG. 26.

Figure 28:
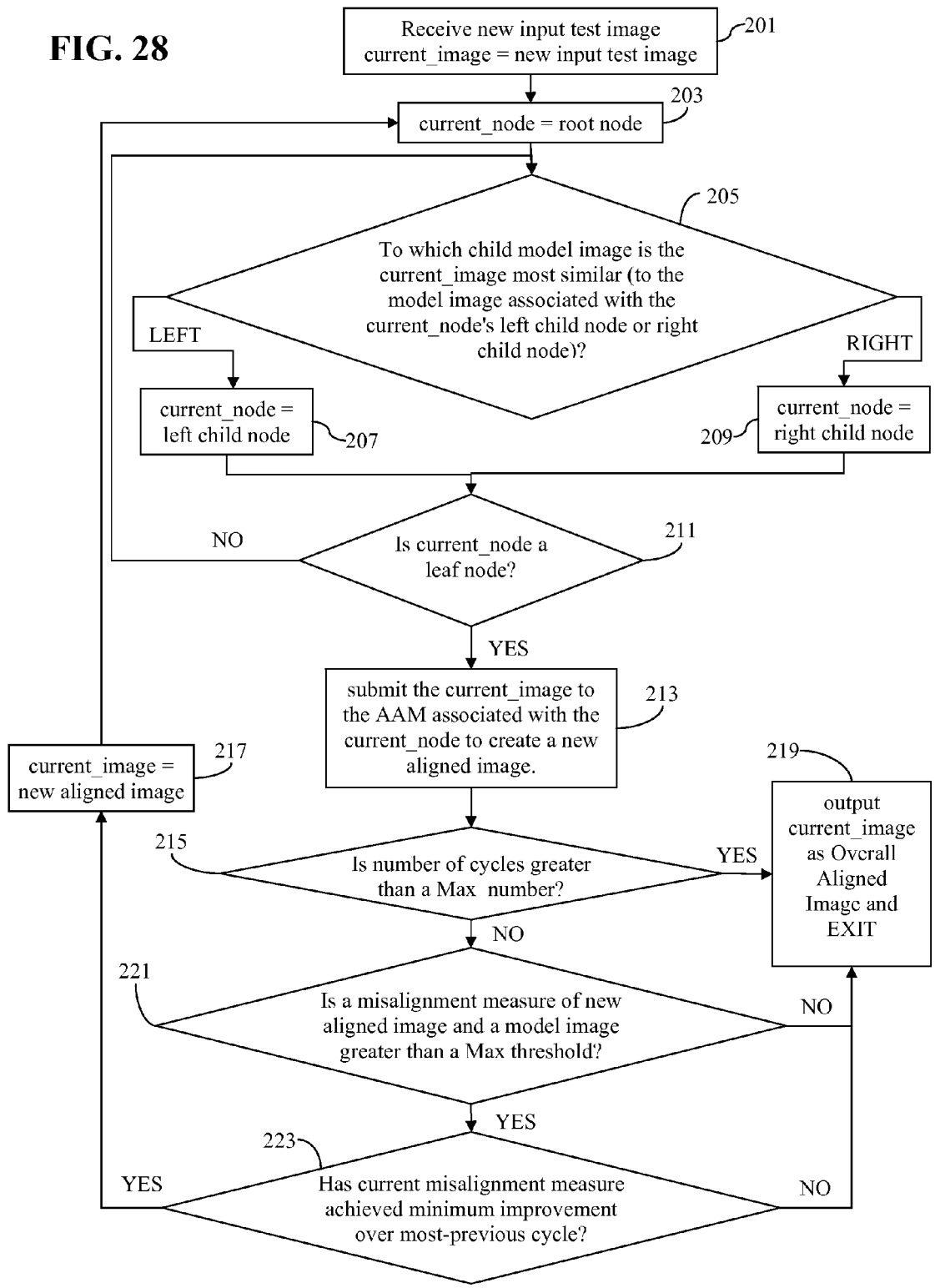
FIG. 28 is a flowchart illustration a data flow of the structure of FIG. 23 in an operation phase.

The use of the hierarchical tree in operation to align an input test image is described above in reference to FIG. 24, but for ease of explanation, a second description is provided in FIG. 28.

With reference to FIG. 28, a new input test image (i.e. new input image) is received, and a memory pointer (i.e. variable), current_image, is made to point to the newly received input test image, step 201. As before, variable current_node may be used to point to the node currently being processed. Since progress through the hierarchical tree start at this root node, current_node is initially set to the root node, step 203. Since the current node is the root node, it is assumed that there are at least two child nodes below the current_node in this first iteration. For convenience, the two child nodes below the current_node are identified as a left child node and a right child node, but it is to be understood that if more than two child nodes were below the current_node, then another suitable naming convention may be used.

In step 205, the current_image is compared with the model images associated with each of its child nodes, and the next processing step would proceed to the child node that is most similar to (i.e. better matches, or is aligned more closely with) the current_image. In the present example, it is assumed that only two child nodes are used, and so if the current_image more closely matches the left child node (step 205=LEFT), then progress through the hierarchical tree would proceed to the next lower level and current_node is set to the left child_node (step 207). Conversely, if the current_image more closely matches the right child node (step 205=RIGHT), then progress through the hierarchical tree proceeds to the next lower level, but the current_node is set to the right child_node (step 209).

At this point (step 211), it is determined if the current_node is a leaf node (i.e. a bottom-most node). If the current node is not a leaf node (step 211=NO), then there is at least one more hierarchical level below the level of the current_node, and processing returns to step 205 to compare the current_image with the model images associated with the left and right child nodes below the current_node. However, if the current node is a leaf node (step 211=YES), then processing proceeds to step 213 where the current_image is submitted to the AAM associated with the current_node, which creates a new aligned image output from the associated AAM.

As is explained above, there are multiple methods for determining when sufficient alignment of the new input test image has been achieved. Four methods (or combination of these) are described above with reference to FIGS. 21-24. A first method is to limit the number of iterations to a maximum number of cycles, such as five, although in practice, five to ten cycles have been shown to be sufficient. A second method is to establish a minimum acceptable measure of misalignment, and to end the cycling through the hierarchical tree when the minimum acceptable measure of misalignment (with the current leaf node's model image, or alternatively with the root node's model image) has been achieved. A third method is to end the cycling through the hierarchical tree when no further reduction in the misalignment is achieved after a current iteration, as compared with the most-previous iteration. A fourth method is to incorporate the leaf node's associated AAM's determination of whether it had successfully aligned its input image into the decision of whether to proceed with further iterations. These methods may be combined to create a more robust determination of when alignment has been achieved within a reasonable processing time. As an illustration, the example of FIG. 28 incorporates the first three methods into its determination of whether another cycle through the hierarchical tree is warranted.

In step 215, one determines if the number of cycles through the hierarchical tree has reached the maximum permissible number of cycles. If it has (step 215=YES), then processing ends (step 219), and the current_image may be output as the overall aligned imaged. But if the current cycle count has not exceeded the maximum number, then processing proceeds to step 221.

In step 221, a measure of the misalignment of the new aligned image and the model image of the current leaf node (or of the root node) is compared with a predefined maximum misalignment measure. If it is greater (step 221=YES) then processing continues to step 223, otherwise (step 221=NO)

processing ends (step 219), and the current_image may be output as the overall aligned imaged.

In step 223, it is determine if a predefined, minimum improvement in alignment has been achieved in the current cycle since the most-previous cycle. If no minimum improvement has been achieved (step 223=NO), then processing ends (step 219), and the current_image may be output as the overall aligned imaged. But if a minimum improvement has been achieved (step 223=YES), then in step 217 the current_image variable is updated to point to the current, new aligned image, and this new current_image is submitted to the top of the hierarchical tree at step 203 to start a new cycle through the hierarchical tree.

Figure 29:
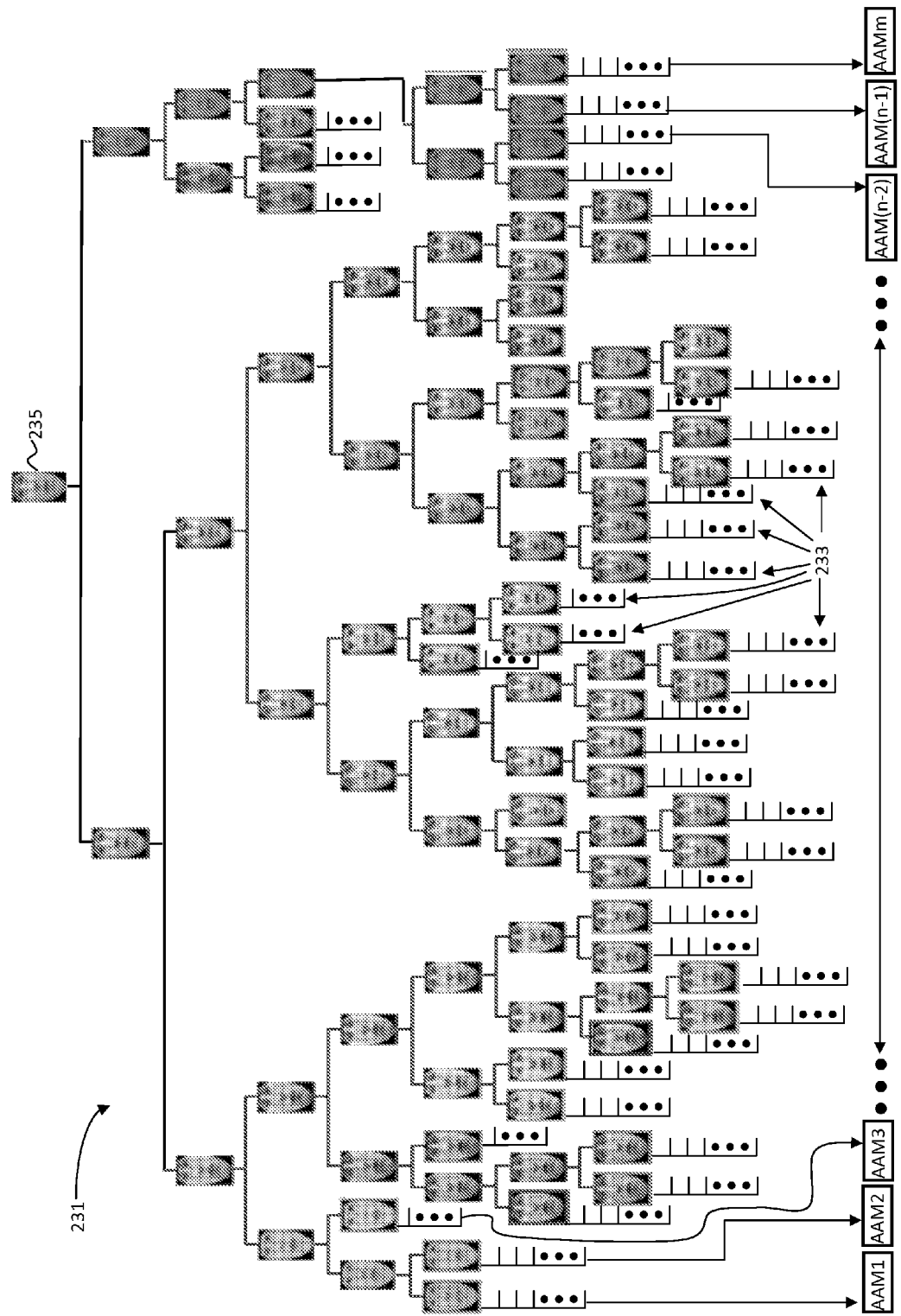
FIG. 29 is another sample implementation of the structure of FIG. 23.

FIG. 29 illustrates another example of a hierarchical tree constructed from a lager number of training images, illustrated as a list of lines and dots under each leaf node 233 (for ease of explanation, only a few of the leaf nodes are labeled). As in the case of FIG. 23, a separate AAM is constructed for each leaf node. In the present example, hierarchical tree 231 has m leaf nodes, and thus has m AAMs, shown as AAM1 through AAMm. Hierarchical tree 231 has an eight-level depth below root node 235, although leaf nodes may be found at any level below root node 235.

As is the case of hierarchical tree 139 of FIG. 23, the tree structure naturally clusters similar faces. Thus, the sample training faces are clustered during the AAM learning process to train a separate specialized AAM at each leaf node. Each leaf node's AAM is specialized since it is trained with a corresponding group of training image having some common characterization trait(s). In operation, the hierarchical tree is searched to find the closest matching AAM model image to an input test image, and the input test image is submitted to the found AAM. If the resultant aligned image does not achieve sufficient alignment, the resultant aligned image is submitted anew to the hierarchical tree for continued processing. This may require multiple cycle searches through the hierarchical tree. Optionally, extracted face texture or an error image can be used to identify the closest matching AAM model face.

Figure 30:
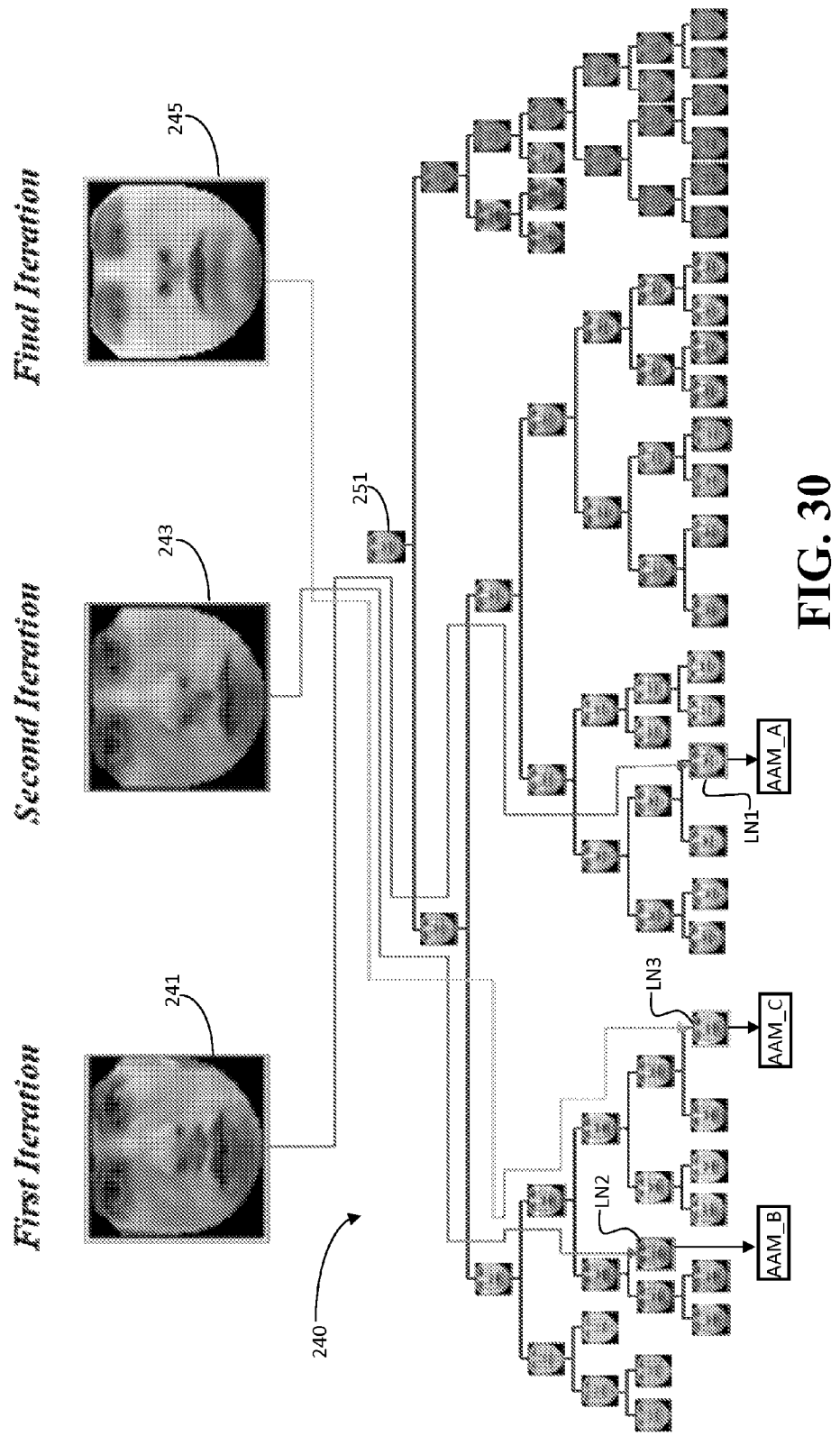
FIG. 30 is another sample implementation of the structure of FIG. 23.

An illustration of a practical search of a hierarchical tree 240 is illustrated in FIG. 30. In this example, three iterations are required to achieve the overall alignment output of an input test image 241. A first iteration follows a path from root node 251 down six levels to leaf node LN1, and application of its associated AAM (AAM_A) produces a first intermediate aligned image 243. Since first intermediate aligned image 243 does not provide sufficient alignment, first intermediate aligned image 243 is submitted to root node 251 for a second iteration.

This second iteration follows a path from root node 251 down five levels to leaf node NL2, and application of its associated AAM (AAM_B), which produces a second intermediate aligned image 245. Again, because second intermediate aligned image 245 does not provide sufficient alignment, second aligned intermediate image 245 is submitted to root node 251 for a third iteration.

This third iteration follows a path from root node 251 down six levels to leaf node NL3, and application of its associated AAM (AAM_C) produces a third intermediate aligned image (not shown). In this case, the third intermediate aligned image satisfies predefined criterion for sufficient alignment, and it is deemed the overall output aligned image.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An object recognition device for recognizing a class of object in an input test image, said device comprising:
   an input for receiving said input test image;
   a plurality of active appearance model processing blocks (AAMs), each of said plurality of AAMs having been trained with a distinct group of independent, digital training images, each training image in all groups of training images having a true example of said class of object with a common, predefined set of characteristic features of said class of object identified and labeled, each group of training images being made distinct by sharing specific traits in select characteristic features distinct from the specific traits in other groups of training images, each of said plurality of AAMs having a corresponding model image and a corresponding statistical model fitting function reflecting the specific traits of the group of training images from which it is trained;
   a data processing module for implementing the following data processing steps:
   (a) defining said input test image as a current_image;
   (b) applying said current_image to a selected AAM selected from among said plurality of AAMs, the selected AAM having a corresponding model image that most closely matches said current_image as compared to the model images corresponding to the not-selected AAMs, the selected AAM processing said current_image to produce an intermediate aligned image;
   (c) IF a misalignment measure of said intermediate aligned image and a predefined model image is greater than a predefined maximum measure,
      THEN defining the intermediate aligned image as said current_image and returning to step (b),
      ELSE outputting said intermediate aligned image as a successful recognition of said class of object.

2. The recognition device of claim 1, wherein in step (c), within said IF statement, said predefined model image is the selected AAM's corresponding model image.

3. The recognition device of claim 1, wherein in step (c), within said IF statement, said predefined model image is a model image created from a combination of all the groups of training images used to train all of said plurality of AAMs.

4. The recognition device of claim 1, wherein in step (c), said IF statement further includes:
   AND IF step (b) has been executed less than a fixed, maximum cycle count.

5. The recognition device of claim 1, wherein in step (c), said IF statement further includes:
   AND IF said misalignment measure is smaller than the misalignment measure obtained in an immediately previous application of step (b).

6. The recognition device of claim 1, wherein in step (b), the selected AAM has a statistical model fitting function whose reflected specific traits most closely match the same traits on the current_image.

7. The recognition device of claim 1, wherein in step (b), a misalignment measure of the current_image and the model image corresponding to the selected AAM is smaller than a misalignment measure of the current_image and the model images corresponding to all other of said plurality of AAMs.

8. The recognition device of claim 1, wherein:
   (A) said plurality of AAMs are accessible through a hierarchical tree path with a separate one of said plurality of AAMs being associated with a corresponding separate leaf node of said hierarchical tree in a one-to-one relationship, said hierarchical tree having:
(1) a root node associated with an extended library of training images comprised of all of said independent training images used in the training of all of said plurality of AAMs;
(2) a plurality of hierarchical levels downward from said root node to each of said leaf nodes, each leaf node being the terminal node (i.e. bottom-most node) in a link-path from said root node to each leaf node, and with each inner node along each link-path from said root node to each leaf node being a parent node having at least a left child node and a right child node;
(3) said extended library being divided progressively into a plurality of smaller groups of training images as one progresses downward from the root node to each leaf node, and each group of training images associated with a leaf node being the distinct group of independent training images used in the training of the leaf node's associated AAM;
(4) at each progressive depth level change from a parent node to its left child node and right child node, the parent node's associated group of training images being divided into two smaller groups, one per left and right child node, according to similarities in characteristic features of the training images, each smaller group being associated with its corresponding child node;
(5) each child node having a corresponding node-model-image created from the training images associated with it; and
(B) the selecting of an AAM from among said plurality of AAMs in step (b) includes:
(i) defining said root node as a current_node;
(ii) IF the current_image more closely matches the node-model-image associated with the current_node's left child node than its right child node, THEN redefining the current_node as the left child node, ELSE redefining the current_node as the right child node;
(iii) IF the current_node is a leaf node, THEN selecting the AAM associated with the current_node to receive said current_image, ELSE returning to step (ii).

9. The recognition device of claim 1, wherein said training of said plurality of AAMs includes the following steps:
(i) accessing an extended training library comprised of all of said independent training images in all of said distinct groups of training images;
(ii) arranging all training images in said extended training library into a hierarchical tree structure according to a measure of similarity of predefined specific characteristic feature(s) of said training images, said hierarchical tree structure having a root node (i.e. topmost node), a plurality of inner nodes, and a plurality of leaf nodes (i.e. terminal nodes), said inner nodes defining link-paths from the root node to each leaf node, the number of leaf nodes being selected so that the number of training images at each leaf node is not greater than a predefined maximum number;
(iii) creating a separate AAM for each leaf node using only the training images associated with each respective leaf node, the collection of thus created AAMs being said plurality of active appearance model processing blocks, AAMs.

10. The recognition device of claim 9, wherein step (ii) includes:

(I) defining said root node and associating with it the entirety of extended training library;
(II) defining said root node as a current_node;
(III) defining a memory pointer current_node_depth as the node depth of said root node;
(IV) applying a processing sequence to the current_node to created child nodes, if necessary;
(V) IF all nodes at the current_node_depth have not been processed, THEN redefining current_node as a next node not yet processed at current_node_depth and returning to step (IV);
(VI) IF there are any other nodes at a depth level below the current_node_depth, THEN incrementing current_node_depth to the next lower depth level, redefining current_node as a next node not yet processed at current_node_depth and returning to step (IV).

11. The recognition device of claim 10, wherein in (IV) said processing sequence includes:
IF the number of training images associated with the current_node is not greater than a max_image_count,
THEN creating an AAM using only the training images associated with the current_node and defining the current_node as a leaf node and associating the created AAM with the current_node,
ELSE:
creating a model image using only the training images associated with the current_node,
sub-dividing the current_node's associated training images into at least first and second groups of training images according to similarities in characteristic features of its associated training images,
creating a first child node under, and linked to, the current_node, and associating said first group of training images with said first child node,
creating a second child node under, and linked to, the current_node, and
associating said second group of training images with said second child node.

12. A method of implementing object recognition to recognize a class of object in an input test image, said method comprising:
receiving said input test image;
providing a plurality of active appearance model processing blocks (AAMs), each of said plurality of AAMs having been trained with a distinct group of independent training images, each training image in all groups of training images having a true example of said class of object with a common, predefined set of characteristic features of said class of object identified and labeled, each group of training images being made distinct by sharing specific traits in select characteristic features distinct from the specific traits in other groups of training images, each of said plurality of AAMs having a corresponding model image and a corresponding statistical model fitting function reflecting the specific traits of the group of training images from which it is trained;
implementing the following data processing steps:
(a) defining said input test image as a current_image;
(b) applying said current_image to a selected AAM selected from among said plurality of AAMs, the selected AAM having a corresponding model image that most closely matches said current_image as compared to the model images corresponding to the not-selected AAMs, the selected AAM processing said current_image to produce an intermediate aligned image;

(c) IF a misalignment measure of said intermediate aligned image and a predefined model image is greater than a predefined maximum measure,
THEN defining the intermediate aligned image as said current_image and returning to step (b),
ELSE outputting said intermediate aligned image as a successful recognition of said class of object.

13. The method of claim 12, wherein in step (c), within said IF statement, said predefined model image is the selected AAM's corresponding model image.

14. The method of claim 12, wherein in step (c), within said IF statement, said predefined model image is a model image created from a combination of all the groups of training images used to train all of said plurality of AAMs.

15. The method of claim 12, wherein in step (c), said IF statement further includes:
AND IF step (b) has been executed less than a fixed, maximum cycle count.

16. The method of claim 12, wherein in step (c), said IF statement further includes:
AND IF said misalignment measure is smaller than the misalignment measure obtained in an immediately previous application of step (b).

17. The method of claim 12, wherein in step (b), the selected AAM has a statistical model fitting function whose reflected specific traits most closely match the same traits on the current_image.

18. The method of claim 12, wherein in step (b), a misalignment measure of the current_image and the model image corresponding to the selected AAM is smaller than a misalignment measure of the current_image and the model images corresponding to all other of said plurality of AAMs.

19. The method of claim 12, wherein:
(A) said plurality of AAMs are accessible through a hierarchical tree path with a separate one of said plurality of AAMs being associated with a corresponding separate leaf node of said hierarchical tree in a one-to-one relationship, said hierarchical tree having:
(1) a root node associated with an extended library of training images comprised of all of said independent training images used in the training of all of said plurality of AAMs;
(2) a plurality of hierarchical levels downward from said root node to each of said leaf nodes, each leaf node being the terminal node (i.e. bottom-most node) in a link-path from said root node to each leaf node, and with each inner node along each link-path from said root node to each leaf node being a parent node having a left child node and a right child node;
(3) said extended library being divided progressively into a plurality of smaller groups of training images as one progresses downward from the root node to each leaf node, and each group of training images associated with a leaf node being the distinct group of independent training images used in the training of the leaf node's associated AAM;
(4) at each progressive depth level change from a parent node to its left child node and right child node, the parent node's associated group of training images being divided into a two smaller groups, one per left and right child node, according to similarities in characteristic features of the training images, each smaller group being associated with its corresponding child node;
(5) each child node having a corresponding node-model-image created from the training images associated with it; and (B) the selecting of an AAM from among said plurality of AAMs in step (b) includes:
(i) defining said root node as a current_node;
(ii) IF the current_image more closely matches the node-model-image associated with the current_node's left child node than its right child node, THEN redefining the current_node as the left child node, ELSE redefining the current_node as the right child node;
(iii) IF the current_node is a leaf node, THEN selecting the AAM associated with the current_node to receive said current_image, ELSE returning to step (ii).

20. The method of claim 12, wherein said training of said plurality of AAMs includes the following steps:
(i) accessing an extended training library comprised of all of said independent training images in all of said distinct groups of training images;
(ii) arranging all training images in said extended training library into a hierarchical tree structure according to a measure of similarity of predefined specific characteristic feature(s) of said training images, said hierarchical tree structure having a root node (i.e. topmost node), a plurality of inner nodes, and a plurality of leaf nodes (i.e. terminal nodes), said inner nodes defining link-paths from the root node to each leaf node, the number of leaf nodes being selected so that the number of training images at each leaf node is not greater than a predefined maximum number;
(iii) creating a separate AAM for each leaf node using only the training images associated with each respective leaf node, the collection of thus created AAMs being said plurality of active appearance model processing blocks, AAMs.

21. The method of claim 20, wherein step (ii) includes:
(I) defining said root node and associating with it the entirety of extended training library;
(II) defining said root node as a current_node;
(III) defining a memory pointer current_node_depth as the node depth of said root node;
(IV) applying a processing sequence to the current_node to created child nodes, if necessary;
(V) IF all nodes at the current_node_depth have not been processed, THEN redefining current_node as a next node not yet processed at current_node_depth and returning to step (IV);
(VI) IF there are any other nodes at a depth level below the current_node_depth, THEN incrementing current_node_depth to the next lower depth level, redefining current_node as a next node not yet processed at current_node_depth and returning to step (IV).

22. The method of claim 21, wherein in step (IV) said processing sequence includes:
IF the number of training images associated with the current_node is not greater than a max_image_count, or if a variance of the training images is not greater than a predefined maximum, if the distance between the training images associated with the current_node is not greater than a predefined maximum of the average of all the images in said distinct groups of independent training images;
THEN creating an AAM using only the training images associated with the current_node and defining the current_node as a leaf node and associating the created AAM with the current_node,
ELSE:
creating a model image using only the training images associated with the current_node, sub-dividing the current_node's associated training images into first and second groups of training images according to similarities in characteristic features of its associated training images, creating a first child node under, and linked to, the current_node, and associating said first group of training images with said first child node, creating a second child node under, and linked to, the current_node, and associating said second group of training images with said second child node.

23. A method of implementing an active appearance model for recognition of a class of object in an input test image, said method comprising:
(i) accessing an extended training library comprised of a plurality of independent training images, each training image having a true example of said class of object with a common, predefined set of characteristic features of said class of object identified and labeled;
(ii) arranging all training images in said extended training library into a hierarchical tree structure according to similarities in predefined specific characteristic feature(s) of said training images, said hierarchical tree structure having a root node (i.e. topmost node), a plurality of inner nodes, and a plurality of leaf nodes (i.e. terminal nodes), said inner nodes defining link-paths from the root node to each leaf node, with each inner node along each link-path from said root node to each leaf node being a parent node having a left child node and a right child node, at each progressive depth level change within said hierarchical tree from a parent node to its left child node and right child node, the parent node's associated group of training images being divided into two smaller groups, one per left and right child node, according to similarities in characteristic features of the training images, each smaller group of training images being associated with its corresponding child node, each child node having a corresponding node-model-image created from its associated training images, the number of leaf nodes being selected so that the number of training images at each leaf node is not greater than a predefined maximum number, the training images at each leaf node sharing specific traits in select characteristic features distinct from the specific traits in the training images at other leaf nodes;
(iii) creating a plurality of active appearance model, AAM, blocks, one per each leaf node using only the training images associated with each respective leaf node, each of said plurality of AAM blocks having a corresponding model image and a corresponding statistical model fitting function reflecting the specific traits of the training images from which it is trained;
(iv) implementing the following data processing steps:
 (a) defining said input test image as a current_image;
 (b) applying said current_image to a selected AAM block selected from among said plurality of AAM blocks, the selected AAM block having a corresponding model image that most closely matches said current_image as compared to the model images corresponding to the not-selected AAM blocks, the selected AAM block processing said current_image to produce an intermediate aligned image;
 (c) IF a misalignment measure of said intermediate aligned image and a predefined model image is greater than a predefined maximum measure,
 THEN defining the intermediate aligned image as said current_image and returning to step (b),
 ELSE outputting said intermediate aligned image as a successful recognition of said class of object.

24. The method of claim 23, wherein step (ii) includes:
(I) defining said root node and associating with it the entirety of extended training library;
(II) defining said root node as a current_node;
(III) defining a memory pointer current_node_depth as the node depth of said root node;
(IV) applying a processing sequence to the current_node to created child nodes, if necessary;
(V) IF all nodes at the current_node_depth have not been processed, THEN redefining current_node as a next node not yet processed at current_node_depth and returning to step (IV);
(VI) IF there are any other nodes at a depth level below the current_node_depth, THEN incrementing current_node_depth to the next lower depth level, redefining current_node as a next node not yet processed at current_node_depth and returning to step (IV).

25. The method of claim 24, wherein in (IV) said processing sequence includes:
IF the number of training images associated with the current_node is not greater than a max_image_count,
THEN defining the current_node as a leaf,
ELSE:
 creating a model image using only the training images associated with the current_node,
 sub-dividing the current_node's associated training images into first and second groups of training images according to similarities in characteristic features of its associated training images,
 creating a first child node under, and linked to, the current_node, and associating said first group of training images with said first child node,
 creating a second child node under, and linked to, the current_node, and associating said second group of training images with said second child node.

26. The method of claim 23, wherein in step (c), within said IF statement, said predefined model image is the selected AAM block's corresponding model image.

27. The method of claim 23, wherein in step (c), within said IF statement, said predefined model image is a model image created from a combination of all the groups of training images used to train all of said plurality of AAM blocks.

28. The method of claim 23, wherein in step (c), said IF statement further includes:
AND IF step (b) has been executed less than a fixed, maximum cycle count.

29. The method of claim 23, wherein in processing step (b), the selected AAM block is selected according to the following sub-step:
(i) defining said root node as a current_node;
(ii) IF the current_image more closely matches the node-model-image associated with the current_node's left child node than its right child node, THEN redefining the current_node as the left child node, ELSE redefining the current_node as the right child node;
(iii) IF the current_node is a leaf node, THEN selecting the AAM block associated with the current_node to receive said current_image, ELSE returning to sub-step (ii).

* * * * *